United States Patent
Coskun et al.

(10) Patent No.: US 12,496,329 B2
(45) Date of Patent: Dec. 16, 2025

(54) METHODS OF USING AND COMPOSITIONS INCLUDING AN INCRETIN ANALOG

(71) Applicant: Eli Lilly and Company, Indianapolis, IN (US)

(72) Inventors: Tamer Coskun, Indianapolis, IN (US); Zvonko Milicevic, Vienna (AT); Shweta Urva, Indianapolis, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 0 days.

(21) Appl. No.: 18/573,779

(22) PCT Filed: Jun. 22, 2022

(86) PCT No.: PCT/US2022/034437
§ 371 (c)(1),
(2) Date: Dec. 22, 2023

(87) PCT Pub. No.: WO2022/271767
PCT Pub. Date: Dec. 29, 2022

(65) Prior Publication Data
US 2024/0325498 A1    Oct. 3, 2024

Related U.S. Application Data

(60) Provisional application No. 63/213,956, filed on Jun. 23, 2021.

(51) Int. Cl.
*A61K 38/26* (2006.01)
*A61P 3/04* (2006.01)
*A61P 3/10* (2006.01)

(52) U.S. Cl.
CPC .............. *A61K 38/26* (2013.01); *A61P 3/04* (2018.01); *A61P 3/10* (2018.01)

(58) Field of Classification Search
CPC .................................. A61K 38/26; A61P 3/04
See application file for complete search history.

(56) References Cited

U.S. PATENT DOCUMENTS

| | | |
|---|---|---|
| 11,542,313 B2 | 1/2023 | Alsina-Fernandez et al. |
| 11,576,950 B2 | 2/2023 | Cox et al. |
| 11,834,486 B2 | 12/2023 | Alsina-Fernandez et al. |
| 11,890,325 B2 | 2/2024 | Riesmeyer et al. |
| 2023/0203121 A1 | 6/2023 | Alsina-Fernandez et al. |
| 2023/0355719 A1 | 11/2023 | Coghlan et al. |

FOREIGN PATENT DOCUMENTS

WO    20190125938 A1    6/2019

OTHER PUBLICATIONS

Ambery P, Parker VE, Stumvoll M, et al. MEDI0382, a GLP-1 and glucagon receptor dual agonist, in obese or overweight patients with type 2 diabetes: a randomised, controlled, double-blind, ascending dose and Phase 2a study. Lancet. 2018;391(10140):2607-2618.
Andersen A, Lund A, Knop FK, Visbøll T. Glucagon-like peptide 1 in health and disease. Nat Rev Endocrinol. 2018;14 (7):390-403.
Azoulay L. Incretin-based drugs and adverse pancreatic events: almost a decade later and uncertainty remains. Diabetes Care. 2015;38(6):951-953.
Bezin J, Gouverneur A, Pénichon M, et al. GLP-1 Receptor Agonists and the Risk of Thyroid Cancer. Diabetes care. 2023;46(2):384-390.
Bhupathiraju SN, Hu FB. Epidemiology of obesity and diabetes and their cardiovascular complications. Circ Res. 2016;118(11):1723-1735.
Drucker DJ. Mechanisms of action and therapeutic application of glucagon-like peptide-1. Cell Metab. 2018;27 (4):740-756.
Einarson TR, Acs A, Ludwig C, Panton UH. Prevalence of cardiovascular disease in type 2 diabetes: a systematic literature review of scientific evidence from across the world in 2007-2017. Cardiovasc Diabetol. 2018;17(1): 83.
Ferdinand KC, White WB, Calhoun DA, et al. Effects of the once-weekly glucagon-like peptide-1 receptor agonist dulaglutide on ambulatory blood pressure and heart rate in patients with type 2 diabetes mellitus. Hypertension. 2014;64(4):731-737.
Finan B, Müller TD, Clemmensen C, Perez-Tilve D, DiMarchi RD, Tschop MH. Reappraisal of GIP pharmacology for metabolic diseases. Trends Mol Med. 2016;22(5):359-376.
Nakatani Y, Kawabe A, Matsumura M, et al. Effects of GLP-1 receptor agonists on heart rate and the autonomic nervous system using Holter electrocardiogramand power spectrum analysis of heart rate variability. Diabetes Care. 2016;39(2): e22-e23.
Nauck, et al., Study 1821 Investigators. A phase 2, randomized, dose-finding study of the novel once[1]weekly human GLP-1 analog, semaglutide, compared with placebo and open-label liraglutide in patients with type 2 diabetes. Diabetes Care. 2016;39(2):231-241.
Powell-Wiley TM, Poirier P, Burke LE, et al.; American Heart Association Council on Lifestyle and Cardiometabolic Health; Council on Cardiovascular and Stroke Nursing; Council on Clinical Cardiology; Council on Epidemiology and Prevention; and Stroke Council. Obesity and Cardiovascular Disease: A Scientific Statement From the American Heart Association. Circulation. 2021;143(21):e984-e1010.
Salem V, Izzi-Engbeaya C, Coello C, DB Thomas, ES Chambers, AN Comninos, A Buckley, Z Win, A Al-Nahhas, EA Rabiner, RN Gunn, H Budge, ME Symonds, SR Bloom, TM Tan, WS Dhillo. Glucagon increases energy expenditure independently of brown adipose tissue activation in humans. Diabetes Obes Metab. 2016;18(1):72-81.

(Continued)

*Primary Examiner* — Gyan Chandra
(74) *Attorney, Agent, or Firm* — Matthew T. Lord

(57) ABSTRACT

Doses and dosing regimens for incretin analogs are disclosed comprising determining and administering doses of long-acting incretin analogs suitable for once-weekly dosing, such as a glucose-dependent insulinotropic polypeptide (GIP), glucagon-like peptide-1 (GLP-1) and glucagon (GCG) (GGG) tri-receptor agonist.

8 Claims, No Drawings
Specification includes a Sequence Listing.

(56) References Cited

OTHER PUBLICATIONS

Simeone JC, Bae JP, Hoogwerf BJ, et al. Clinical course of nonalcoholic fatty liver disease: an assessment of severity, progression, and outcomes. Clin Epidemiol. 2017;9:679-688.

Sodhi M, Rezaeianzadeh R, Kezouh A, Etminan M. Risk of Gastrointestinal Adverse Events Associated With Glucagon-Like Peptide-1 Receptor Agonists for Weight Loss. JAMA. 2023;330(18):1795-1797.

Suarez EA, Koro CE, Christian JB, et al. Incretinmimetic therapies and pancreatic disease: a review of observational data. Curr Med Res Opin. 2014;3(12):2471-2481.

Thompson CA and Sturmer T. Putting GLP-1 RAs and Thyroid Cancer in Context: Additional Evidence and Remaining Doubts. Diabetes Care. 2023;46(2): 249-251.

Thomsen RW, Pedersen L, Møller N, et al. Incretin-based therapy and risk of acute pancreatitis: a nationwide population-based case-control study. Diabetes Care. 2015;38(6):1089-1098.

Tillner J, Posch MG, Wagner F, et al. A novel dual glucagon-like peptide and glucagon receptor agonist SAR425899: results of randomized, placebo-controlled first-in-human and first-in-patient trials. Diabetes Obes Metab. 2019;21 (1):120-128.

Urva S, Coskun T, Loh MT, et al. LY3437943, a novel triple GIP, GLP-1, and glucagon receptor agonist in people with type 2 diabetes: a phase 1b, multicentre, double-blind, placebo-controlled, randomised, multiple-ascending dose trial. Lancet (London, England). 2022;400(10366):1869-1881.

Visentin R, Schiavon M, Göbel B, et al. Dual glucagon-like peptide-1 receptor/glucagon receptor agonist SAR425899 improves beta-cell function in type 2 diabetes. Diabetes Obes Metab. 2020;22(4):640-647.

Yang Z, Lv Y, Yu M, et al. GLP-1 receptor agonist-associated tumor adverse events: A real-world study from 2004 to 2021 based on FAERS. Frontiers in pharmacology. 2022;13:925377.

Blundell et al: "Effects of Once-Weekly Semaglutide on Appetite", Diabetes, Obestiy and Metabolism, vol. 19, No. 9, May 6, 2017 pp. 1242-1251.

Coskun et al: "679-9: The Novel GIP, GLP-1 and Glucagon Triple Receptor Agonist LY3437943 Exhibits Robust Efficacy in Preclinical Models of Obestiy and Diabetes / Diabetes / American Diabetes Association", Diabetes, vol. 70 No. Supplement 1, Jun. 1, 2021, pp. 1-7.

Coskun et al: "LY3298176, a novel dual GIP and GLP-1 receptor agonist" Molecular Metabolism, vol. 18, Oct. 3, 2018, pp. 3-14.

Coskun et al: "LY3437943, a novel triple glucagon, GIP, and GLP-1 receptor agonist for glycemic control and weight loss: From discovery to clinical proof of concept", Cell Metabolism, Cell Press, United States, vol. 34, No. 9, Aug. 18, 2022, pp. 1234-1247.

Pablo et al: "Efficacy and Tolerability of Tirzepatide", Diabetes, Obesit and Metabolism, vol. 22, No. 6, Jun. 1, 2020 pp. 938-946.

Urva et al: "104-OR: Novel GIP/GLP-1/Glucagon Receptor Agonist LY3437943: A First-in-Human Dose Study in Healthy Subjects/ Diabetes/ American Diabetes Association", Diabetes, vol. 70 No. Supplement 1, Jun. 1, 2021, pp. 1-7.

Inernational Search Report issued by the European Patent Office for International Application No. PCT/US2022/034437 dated Dec. 15, 2022.

American Diabetes Association. 6. Glycemic targets: standards of medical care in diabetes—2020. Diabetes Care. 2020;43(Suppl 1):S66-S76.

Baggio and Drucker 2004. Best Pract Res Clin Endocrinol Metab. 2004;18(4):531-554.

Barrington P, Chien JY, Tibaldi F, Showalter HD, Schneck K, Ellis B. LY2189265, a long-acting glucagon-like peptide-1 analogue, showed a dose-dependent effect on insulin secretion in healthy subjects. Diabetes Obes Metab. 2011;13 (5):434-438.

Blasé E, Taylor K, Gao HY, et al. Pharmacokinetics of an oral drug (acetaminophen) administered at various times in relation to subcutaneous injection of exenatide (exendin-4) in healthy subjects. J Clin Pharmacol. 2005;45(5):570-577.

Blonde L, Jendle J, Gross J, Woo V, Jiang H, Fahrbach JL, Milicevic Z. Once-weekly dulaglutide versus bedtime insulin glargine, both in combination with prandial insulin lispro, in patients with type 2 diabetes (AWARD-4): a randomised, open-label, phase 3, non-inferiority study. Lancet. 2015;385(9982):2057-2066.

Ferdinand KC, Botros FT, Atisso CM, Sager PT. Cardiovascular safety for once-weekly dulaglutide in type 2 diabetes: a pre-specified meta-analysis of prospectively adjudicated cardiovascular events. Cardiovasc Diabetol. 2016;15:38.

Food and Drug Administration. Endocrinologic and metabolic drugs advisory committee meeting. 2017. Available at: https://www.fda.gov/downloads/AdvisoryCommittees/CommitteesMeetingMaterials/Drugs/EndocrinologicandMetabolicDrugsAdvisoryCommittee/UCM580460.pdf. Accessed Nov. 14, 2017.

Geiger et al., An Adaptive, Dose-Finding, Seamless Phase 2/3 Study of a Long-Acting Glucagon-Like Peptide-1 Analog (Dulaglutide): Trial Design and Baseline Characteristics; J Diabetes Sci Technol. 2012; 6(6):1319-1327.

Giorgino F, Benroubi M, Sun JH, Zimmermann AG, Pechtner V. Efficacy and safety of once-weekly dulaglutide versus insulin glargine in patients with type 2 diabetes on metformin and glimepiride (AWARD-2). Diabetes Care. 2015;38 (12):2241-2249.

Holman,et al., Effects of once-weekly exenatide on cardiovascular outcomes in type 2 diabetes. N Engl J Med. 2017;377:1228-1239.

Jacobsen et al., Treatment with liraglutide-a once-daily GLP-1 analog-does not reduce the bioavailability of ethinyl estradiol/levonorgestrel taken as an oral combination contraceptive drug. J Clin Pharmacol. 2011;51(12):1696-1703.

Jendle J, Grunberger G, Blevins T, Giorgino F, Hietpas RT, Botros FT. Efficacy and safety of dulaglutide in the treatment of type 2 diabetes: a comprehensive review of the dulaglutide clinical data focusing on the AWARD phase 3 clinical trial program. Diabetes Metab Res Rev. 2016;32(8):776-790.

Kapitza C, Nosek L, Jensen L, Hartvig H, Jensen CB, Flint A. Semaglutide, a once-weekly human GLP-1 analog, does not reduce the bioavailability of the combined oral contraceptive, ethinylestradiol/levonorgestrel. J Clin Pharm. 2015;55 (5):497-504.

Kapitza C, Zdravkovic M, Hindsberger C, Flint A. The effect of the once-daily human glucagonlike peptide 1 analog liraglutide on the pharmacokinetics of acetaminophen. Adv Ther. 2011;28(8):650-660.

Kothare PA, Seger ME, Northrup J, et al. Effect of exenatide on the pharmacokinetics of a combination oral contraceptive in healthy women: an open-label, randomised, crossover trial. BMC Clin Pharmacol. 2012;12:8.

Kothare PA, Soon DK, Linnebjerg H, et al. Effect of exenatide on the steady-state pharmacokinetics of digoxin. J Clin Pharmacol. 2005;45(9):1032-1037.

Kristensen et al. 2019), Lancet Diabetes Endocrinol. 2019; 7(10):776-785.

Linnebjerg et al. (2008) Linnebjerg H, Kothare P, Park S, Mace K, Mitchell M. The effect of exenatide on lisinopril pharmacodynamics and pharmacokinetics in patients with hypertension. Int J Clin Pharmacol Ther. 2009;47 (11):651-658.

Lorenz M, Lawson F, Owens D, Raccah D, Roy-Duval C, Lehmann A, Perfetti R, Blonde L. Differential effects of glucagon-like peptide-1 receptor agonists on heart rate. Cardiovasc Diabetol. 2017;16(1):6.

Malm-Erjefalt et al. 2015). Malm-Erjefalt M, Ekblom M, Vouis J, et al. Effect on the gastrointestinal absorption of drugs from different classes in the biopharmaceutics classification system, when treating with liraglutide. Mol Pharm. 2015;12 (11):4166-4173.

Marso, et al., Semaglutide and cardiovascular outcomes in patients with type 2 diabetes. N Engl J Med. 2016b;375 (19):1834-1844.

Marso, et al.,LEADER Steering Committee; LEADER Trial Investigators. Liraglutide and cardiovascular outcomes in type 2 diabetes. N Engl J Med. 2016a;375(4):311-322.

Meier et al. (2015). Meier JJ, Nauck MA. Glucagon-like peptide 1 (GLP-1) in biology and pathology. Diabetes Metab Res Rev. 2005;21(2):91-117.

Nauck MA, Frossard J-L, Barkin JS, Anglin G, Hensley IE, Harper KD, Milicevic Z. Assessment of pancreas safety in the development program of once weekly GLP-1 receptor agonist dulaglutide. Diabetes Care. 2017;40(5):647-654.

(56) References Cited

OTHER PUBLICATIONS

Pfeffer, et al., Lixisenatide in patients with type 2 diabetes and acute coronary syndrome. N Engl J Med. 2015;373 (23):2247-2257.

Soon 2006; Soon D, Kothare PA, Linnebjerg H, et al. Effect of exenatide on the pharmacokinetics and pharmacodynamics of warfarin in healthy Asian men. J Clin Pharmacol. 2006;46(10):1179-1187.

Sorli, et al., Efficacy and safety of once-weekly semaglutide monotherapy versus placebo in patients with type 2 diabetes (SUSTAIN 1): a double-blind, randomised, placebo-controlled, parallel-group, multinational, multicentre phase 3a trial. Lancet Diabetes Endocrinol. 2017;5(4):251-260.

Van Can et al. 2014). van Can J, Sloth B, Jensen CB, et al. Effects of the once-daily GLP-1 analog liraglutide on gastrid emptying, glycemic parameters, appetite and energy metabolism in obese, non-diabetic adults. Int J Obes (Lond). 2014;38(6):784-793.

Weinstock RS, Guerci B, Umpierrez G, Nauck MA, Skrivanek Z, Milicevic Z. Safety and efficacy of once-weekly dulaglutide versus sitagliptin after 2 years in metformin-treated patients with type 2 diabetes (AWARD-5): a randomized, phase III study. Diabetes Obes Metab. 2015;17(9):849-858.

Wysham C, Blevins T, Arakaki R, Colon G, Garcia P, Atisso C, Kuhstoss D, Lakshmanan M. Efficacy and safety of dulaglutide added onto pioglitazone and metformin versus exenatide in type 2 diabetes in a randomized controlled trial (AWARD-1). Diabetes Care. 2014;37(8):2159-2167.

SEQUENCE LISTING

```
<160> NUMBER OF SEQ ID NOS: 1

<210> SEQ ID NO 1
<211> LENGTH: 39
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: Xaa at position 2 is Aib
<220> FEATURE:
<221> NAME/KEY: MISC_FEATURE
<222> LOCATION: (13)..(13)
<223> OTHER INFORMATION: Xaa at position 13 is alpha-methyl Leu
<220> FEATURE:
<221> NAME/KEY: MOD_RES
<222> LOCATION: (17)..(17)
<223> OTHER INFORMATION: Lys at position 17 is chemically modified
      through conjugation to the epsilon amino group of the K side-chain
      with (2-[2-(2-aminoethoxy)-ethoxy]-acetyl)-(gamma-Glu)-CO-
      (CH2)18CO2H
<220> FEATURE:
<221> NAME/KEY: MISC_FEATURE
<222> LOCATION: (20)..(20)
<223> OTHER INFORMATION: Xaa at position 20 is Aib
<220> FEATURE:
<221> NAME/KEY: MOD_RES
<222> LOCATION: (39)..(39)
```

```
<223> OTHER INFORMATION: Ser is amidated as a C-terminal primary amide

<400> SEQUENCE: 1

Tyr Xaa Gln Gly Thr Phe Thr Ser Asp Tyr Ser Ile Xaa Leu Asp Lys
 1               5                  10                  15

Lys Ala Gln Xaa Ala Phe Ile Glu Tyr Leu Leu Glu Gly Gly Pro Ser
             20                  25                  30

Ser Gly Ala Pro Pro Pro Ser
         35
```

METHODS OF USING AND COMPOSITIONS INCLUDING AN INCRETIN ANALOG

TECHNICAL FIELD

The disclosure relates to methods of using and compositions having an incretin analog with activity at each of a glucose-dependent insulinotropic polypeptide (GIP) receptor, glucagon-like peptide-1 (GLP-1) receptor and glucagon (GCG) receptor, especially to methods of using certain doses of an incretin analog and compositions containing certain doses of an incretin analog that can be used for treating conditions, diseases and disorders including diabetes mellitus (especially type 2 diabetes mellitus (T2DM)), obesity and comorbidities associated with obesity, like dyslipidemia, non-alcoholic steatohepatitis (NASH), non-alcoholic fatty liver disease (NAFLD), obstructive sleep apnea, osteoarthritis, polycystic ovary syndrome and chronic kidney disease, and others.

BACKGROUND

Over the past several decades, the prevalence of diabetes mellitus continues to rise, which is a chronic disorder characterized by hyperglycemia resulting from defects in insulin secretion, insulin action, or both. T2DM is the most common form of diabetes, accounting for about 90% of all diabetes. In T2DM, the combined effects of impaired insulin secretion and insulin resistance are associated with elevated blood glucose levels.

Uncontrolled diabetes can lead to one or more conditions that impact morbidity and mortality of such individuals. One of the main risk factors for T2DM is obesity, and many individuals with T2DM (~90%) are overweight or obese. It is documented that a decrease in body adiposity will lead to improvement in obesity-associated comorbidities.

The current standard of care for T2DM includes diet and exercise, as well as treatment with oral medications and injectable glucose-lowering drugs including incretin-based therapies, such as GLP-1 receptor agonists. Despite the treatment options available, significant numbers of individuals receiving approved therapies are not reaching glycemic control goals (see, e.g., Casagrande et al. (2013) *Diabetes Care* 36:2271-2279).

Intl. Patent Application Publication No. WO 2019/125938 describes incretin analogs that act as GCG, GLP-1 and GIP (GGG) tri-receptor agonists and that can be used for treating diabetes, obesity, obesity-related comorbidities. These GGG tri-receptor agonists exhibit a prolonged activity and thus appear suitable for once-weekly administration.

There are, however, potential problems associated with administration of products with prolonged activity at each of the GCG, GLP-1 and GIP receptors. For instance, it is well-known that GLP-1 single agonist treatments are associated with nausea, vomiting, and/or diarrhea. For example, one study reported that all GLP-1 receptor agonist dosing regimens significantly increased the incidence of gastrointestinal adverse events. *Diabetes Technol Ther.* 2015 January; 17 (1): 35-42. Clinical trials of GIP/GLP-1 and GLP-1/GCG dual agonist compounds have also indicated that tolerability at high doses is limited by gastrointestinal adverse events. See e.g. Schmitt, C. et al., Diabetes Obes. Metab. 2017; 19:1436-1445; Portron, A. et al., 2390-PUB, A624, ADA-2017; Portron, A. et al., Diabetes Obes. Metab. 2017; 19:1446-1453; Ambery P. D. et al., British Journal of Clinical Pharmacology, 2018 October; 84 (10): 2325-2335; Alba M. et al., Clinical Obesity, 2021 April; 11 (2): e12432).

Thus, development of effective doses and dosing regimen for a triple agonist that has activity at all three GCG, GLP-1 and GIP receptors remains an unpredictable and challenging task. The dose limitation associated with gastrointestinal adverse events may prevent dosing to the desired effective dose, may compromise patient compliance with treatment, and may limit the effectiveness of the treatment regimen. In addition, administration of a compound having prolonged activity once-weekly may require multiple weeks to reach a steady state of activity, especially balanced activity, resulting in sub-optimal control in the interim.

Therefore, there is a need for optimized doses and dosing regimens of GGG tri-receptor agonists that provide effective glycemic control and/or effective weight management in an individual in need of such treatment, while also preserving an overall acceptable profile of safety and adverse events and tolerability to the individual.

BRIEF SUMMARY

To address this need, the disclosure describes doses of a GGG tri-receptor agonist having a structure of SEQ ID NO:1, where such doses can be from about 0.5 mg to about 12.0. In some instances, the dose is from about 0.5 mg to about 4.0 mg, from about 2.0 mg to about 8.0 mg, or from about 4.0 mg to about 12.0 mg. In other instances, the dose is ≤12.0 mg.

The disclosure also describes pharmaceutical formulations that include a GGG tri-receptor agonist having a structure of SEQ ID NO: 1 at a dose of about 0.5 mg to about 12.0 mg.

The disclosure also describes methods of improving glycemic control in an individual, providing chronic weight management in an overweight or obese individual, as well as methods of treating diabetes mellitus (especially T2DM), dyslipidemia, metabolic syndrome, NAFLD, NASH and/or obesity, obstructive sleep apnea, osteoarthritis, polycystic ovary syndrome and/or chronic kidney disease.

In one aspect, the disclosure describes methods of improving glycemic control in an individual, where such methods include administering to the individual a first once weekly dose of a GGG tri-receptor agonist comprising SEQ ID NO:1 for at least about 1 week, where the first once weekly dose is from about 0.5 mg to about 4.0 mg.

In some instances, the methods also include administering to the individual a second once weekly dose of the GGG tri-receptor agonist for at least 1 week. In some instances, the second once weekly dose can be less than the first once weekly dose. Alternatively, the second once weekly dose can be the same as the first once weekly dose. Alternatively, the second once weekly dose can be greater than the first once weekly dose. In some instances, the second once weekly dose is from about 2.0 mg to about 8.0 mg.

In some instances, the methods also include administering to the individual a third once weekly dose of the GGG tri-receptor agonist for at least 1 week. In some instances, the third once weekly dose can be less than the second once weekly dose. Alternatively, the third once weekly dose can be the same as the second once weekly dose. Alternatively, the third once weekly dose can be greater than the second once weekly dose. In some instances, the third once weekly dose is from about 4.0 mg to about 12.0 mg.

In some instances, the methods also include administering to the individual a fourth once weekly dose of the GGG tri-receptor agonist for at least 1 week. In some instances, the fourth once weekly dose can be less than the third once weekly dose. Alternatively, the fourth once weekly dose can be the same as the third once weekly dose. Alternatively, the fourth once weekly dose can be greater than the third once weekly dose. In some instances, the fourth once weekly dose is from about 6.0 mg to about 12.0 mg.

In some instances, the methods also include a step of administering to the individual a fifth once weekly dose of the GGG tri-receptor agonist for at least 1 week. In some instances, the fifth once weekly dose can be less than the fourth once weekly dose. Alternatively, the fifth once weekly dose can be the same as the fourth once weekly dose. Alternatively, the fifth once weekly dose can be greater than the fourth once weekly dose. In some instances, the fifth once weekly dose is from about 8.0 mg to about 12.0 mg.

In some instances, each once weekly dose (the first once weekly dose and the subsequent once weekly doses) is administered for at least about two weeks. In some instances, each once weekly dose is administered for at least about four weeks.

In one embodiment, the first once weekly dose is 2.0 mg, the second once weekly dose is 4.0 mg, the third once weekly dose is 8.0 mg, and the fourth once weekly dose is 12.0 mg. In another embodiment, the first once weekly dose is 2.0 mg, the second once weekly dose is 4.0 mg, the third once weekly dose is 6.0 mg, the fourth once weekly dose is 9.0 mg, and the fifth once weekly dose is 12.0 mg.

In another aspect, the disclosure describes methods of improving glycemic control in an individual where such methods include administering to the individual a first once weekly dose of a GGG tri-receptor agonist comprising SEQ ID NO:1, where the first once weekly dose is from about 0.5 mg to about 4.0 mg and is administered for at least 1 week. The methods further include increasing the first once weekly dose by increments of about 1.0 to about 4.0 mg to a once weekly dose of ≤12.0 mg, wherein each increased once weekly dose is administered for at least 1 week.

In some instances, the first once weekly dose and each increased once weekly dose are administered for at least about two weeks. In some instances, the first once weekly dose and each increased once weekly dose are administered for at least about four weeks.

In some instances, the first once weekly dose is ≥1.0 mg and is increased at 4-week intervals by about 1.0, 2.0, 3.0 or 4.0 mg increments until achieving a dose of about 8.0 mg or about 9.0 mg or about 10.0 mg or about 11.0 mg or about 12.0 mg.

In some instances, the first once weekly dose is selected from 1.0 or 2.0 mg and the increased once weekly doses are selected from 2.0, 3.0, 4.0, 6.0, 8.0, 9.0, 10.0 or 12.0 mg.

In one embodiment, the first once weekly dose is 2.0 mg, and the increased once weekly doses are 4.0, 8.0 and 12.0 mg. In another embodiment, the first once weekly dose is 2.0 mg, and the increased once weekly doses are 4.0, 6.0, 9.0 and 12.0 mg.

In another aspect, the disclosure describes methods of improving glycemic control in an individual, where such methods include a step (a) of administering to the individual from about 0.5 mg to about 4.0 mg of a GGG tri-receptor agonist comprising a structure of SEQ ID NO: 1 suitable for once-weekly dosing for at least 1 week. The methods also include a step (b) of administering to the individual from about 2.0 mg to about 8.0 mg of the GGG tri-receptor agonist once weekly for at least 1 week. The methods also include a step (c) of administering to the individual from about 8.0 mg to about 12.0 mg of the GGG tri-receptor agonist once weekly for at least 1 week.

In another aspect, the disclosure describes methods of providing chronic weight management in an individual, where such methods include administering to the individual a first once weekly dose of a GGG tri-receptor agonist comprising SEQ ID NO:1 for at least about 1 week, where the first once weekly dose is from about 0.5 mg to about 4.0 mg.

In some instances, the methods also include administering to the individual a second once weekly dose of the GGG tri-receptor agonist for at least 1 week. In some instances, the second once weekly dose can be less than the first once weekly dose. Alternatively, the second once weekly dose can be the same as the first once weekly dose. Alternatively, the second once weekly dose can be greater than the first once weekly dose. In some instances, the second once weekly dose is from about 2.0 mg to about 8.0 mg.

In some instances, the methods also include administering to the individual a third once weekly dose of the GGG tri-receptor agonist for at least 1 week. In some instances, the third once weekly dose can be less than the second once weekly dose. Alternatively, the third once weekly dose can be the same as the second once weekly dose. Alternatively, the third once weekly dose can be greater than the second once weekly dose. In some instances, the third once weekly dose is from about 4.0 mg to about 12.0 mg.

In some instances, the methods also include a step of administering to the individual a fourth once weekly dose of the GGG tri-receptor agonist for at least 1 week. In some instances, the fourth once weekly dose can be less than the third once weekly dose. Alternatively, the fourth once weekly dose can be the same as the third once weekly dose. Alternatively, the fourth once weekly dose can be greater than the third once weekly dose. In some instances, the fourth once weekly dose is from about 6.0 mg to about 12.0 mg.

In some instances, the methods also include a step of administering to the individual a fifth once weekly dose of the GGG tri-receptor agonist for at least 1 week. In some instances, the fifth once weekly dose can be less than the fourth once weekly dose. Alternatively, the fifth once weekly dose can be the same as the fourth once weekly dose. Alternatively, the fifth once weekly dose can be greater than the fourth once weekly dose. In some instances, the fifth once weekly dose is from about 8.0 mg to about 12.0 mg.

In some instances, each once weekly dose is administered for at least about two weeks. In some instances, each once weekly dose is administered for at least about four weeks.

In one embodiment, the first once weekly dose is 2.0 mg, the second once weekly dose is 4.0 mg, the third once weekly dose is 8.0 mg, and the fourth once weekly dose is 12.0 mg. In another embodiment, the first once weekly dose is 2.0 mg, the second once weekly dose is 4.0 mg, the third once weekly dose is 6.0 mg, the fourth once weekly dose is 9.0 mg, and the fifth once weekly dose is 12.0 mg.

In another aspect, the disclosure describes methods of providing chronic weight management in an individual, where such methods include administering to the individual a first once weekly dose of a GGG tri-receptor agonist having a structure of SEQ ID NO:1, where the first once weekly dose is from about 0.5 mg to about 4.0 mg and is administered for at least 1 week. The methods include increasing the first once weekly dose by increments of about 1.0 mg to about 4.0 mg to a once weekly dose of ≤12.0 mg, wherein each increased once weekly dose is administered for at least 1 week.

In some instances, the first once weekly dose and each increased once weekly dose are administered for at least about two weeks. In some instances, the first once weekly dose and each increased once weekly dose are administered for at least about four weeks.

In certain instances, the first once weekly dose is ≥1.0 mg and is increased at 4-week intervals by about 1.0, 2.0, 3.0 or 4.0 mg increments until achieving a dose of about 8.0 mg or about 9.0 mg or about 10.0 mg or about 11.0 mg or about 12.0 mg.

In one embodiment, the first once weekly dose is 2.0 mg, and the increased once weekly doses are 4.0, 8.0 and 12.0 mg. In another embodiment, the first once weekly dose is 2.0 mg, and the increased once weekly doses are 4.0, 6.0, 9.0 and 12.0 mg.

In another aspect, the disclosure describes methods of providing chronic weight management in an individual, where such methods include a step (a) of administering to the individual from about 0.5 mg to about 4.0 mg of a GGG tri-receptor agonist having a structure of SEQ ID NO: 1 suitable for once-weekly dosing for at least 1 week. The methods also include a step (b) of administering to the individual from about 2.0 mg to about 8.0 mg of the GGG tri-receptor agonist for at least 1 week. The methods also include a step (c) of administering to the individual from about 8.0 mg to about 12.0 mg of the GGG tri-receptor agonist once weekly for at least 1 week.

In some instances, the individual has diabetes, especially T2DM. In some instances, the individual is overweight or obese or has obesity. In some instances, the individual initially has a body mass index (BMI) of ≥27 kg/m² but <30 kg/m² and thus is overweight. In other instances, the individual initially has a BMI≥30 kg/m² and thus is obese.

In another aspect, methods for treating diabetes mellitus (especially T2DM), dyslipidemia, metabolic syndrome, NAFLD, NASH and/or obesity, obstructive sleep apnea, osteoarthritis, polycystic ovary syndrome and/or chronic kidney disease are also described herein.

In addition to the above methods, uses are described for a GGG tri-receptor agonist having a structure of SEQ ID NO: 1 suitable for once-weekly dosing for improving glycemic control or for providing chronic weight management in an individual, where the dose of the GGG tri-receptor agonist to be administered is obtainable by one or more of the methods described herein.

Likewise, uses are described for a GGG tri-receptor agonist comprising SEQ ID NO: 1 suitable for once-weekly dosing for treating diabetes mellitus (especially T2DM), dyslipidemia, metabolic syndrome, NAFLD, NASH and/or obesity, obstructive sleep apnea, osteoarthritis, polycystic ovary syndrome and/or chronic kidney disease, where the dose of the GGG tri-receptor agonist to be administered is obtainable by one or more of the methods described herein.

An advantage of the doses, regimens, methods and uses herein is that the GGG tri-receptor analog provides a longer duration of action and fewer AEs, thus requiring fewer injections than currently available incretin analogs, including as infrequently as once-weekly. Such products would have the potential to improve acceptance and compliance.

DETAILED DESCRIPTION

Overview

GCG is a twenty-nine amino acid hormone involved with the metabolism of amino acids, lipids and carbohydrates. GCG plays an important role in blood glucose regulation between meals, and overall body weight reduction. GLP-1 is an incretin hormone that regulates insulin and glucagon secretion. GIP is a gastric inhibitory peptide that exhibits a strong incretin effect on glucose-dependent secretion of insulin and has a known complementary effect with GLP-1 to improve glucose control and weight loss. Synergistic effects of a GGG tri-receptor agonist for these three receptors is postulated to result in a more potent, efficacious therapy than the current standard of care. Intl. Patent Application Publication No. WO 2019/125938 describes the structure, function, production and use of GGG tri-receptor agonists that can be used for treating diabetes, obesity, obesity related comorbidities and other medical conditions. Of particular interest herein is the GGG tri-receptor agonists described therein in Example 12, which is a fatty acid acylated, long-acting GGG tri-receptor agonist (SEQ ID NO:1).

Unfortunately, many individuals with diabetes fail to reach their HbA1c goals and struggle with weight management, so new therapies and dosing regimens capable of providing additional glycemic control and/or weight loss are needed. Moreover, while simply increasing the dose of a therapeutic agent may, in some cases, be capable of achieving increased efficacy, increasing the dose of the therapeutic agent, especially one having activity at each of the GIP, GLP-1 and GCG receptors, also carries a risk of greater side effects. For example, a Phase 1 study with a GGG tri-receptor agonist demonstrated a risk of diarrhea, emesis and nausea. In fact, in the Phase 1 study described herein, individuals treated with 6.0 mg or higher doses of a GGG tri-receptor agonist in a Phase 1 dosing study exhibited a higher-than-expected incidence of GI AEs that are commonly related to the treatment with incretin analogs like a GGG tri-receptor agonist such as, for example, emesis and nausea.

Multiple aspects of dosing regimens for and methods of using a GGG tri-receptor agonist suitable for once-weekly dosing are described herein. In certain instances, the regimens and methods described herein include determining and administering an initial dose of such GGG tri-receptor agonists. In other aspects, the regimens and methods described herein include determining and administering maintenance doses, including when and how to adjust maintenance doses. In other aspects, the regimens and methods herein describe a fixed dose regimen.

Unless defined otherwise, all technical and scientific terms used herein have the same meaning as commonly understood by one of skill in the art to which the disclosure pertains. Although any methods and materials similar to or equivalent to those described herein can be used in the practice or testing of the GGG tri-receptor agonist, pharmaceutical compositions and methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one."

Definitions

As used herein, "about" means within a statistically meaningful range of a value or values such as, for example, a stated concentration, length, molecular weight, pH, sequence identity, time frame, temperature or volume. Such a value or range can be within an order of magnitude typically within 20%, more typically within 10%, and even more typically within 5% of a given value or range. The allowable variation encompassed by "about" will depend upon the particular system under study, and can be readily appreciated by one of skill in the art.

As used herein, and in reference to one or more of the GIP, GLP-1 or GCG receptors, "activity," "activate," "activating" and the like means a capacity of a compound, such as the GGG tri-receptor agonist herein, to bind to and induce a response at the receptor(s), as measured using assays known in the art.

As used herein, "amino acid" means a molecule that, from a chemical standpoint, is characterized by containing one or more amine groups and one or more carboxylic acid groups and may contain other functional groups. As is known in the art, there is a set of twenty amino acids that are designated as standard amino acids and that are used as building blocks for most of the peptides/polypeptides/proteins produced by any living being.

As used herein, "analog" means a compound, such as a synthetic peptide or polypeptide, that activates a target receptor and that elicits at least one in vivo or in vitro effect elicited by a native receptor agonist.

As used herein, "dose" or "doses" means a quantity of a GGG tri-receptor agonist for once weekly dosing that is administered to an individual in a discrete amount at a particular point in time. When used in connection with the terms dose, dosing, doses and the like, "adjustment" means a quantity of any decrease or increase to the dose administered the prior week. When used in connection with the terms dose, dosing, doses and the like, "regimen" means a set of guidelines for determining and administering one or more doses and/or adjustments thereto.

As used herein, "effective amount" means an amount, concentration or dose of one or more of the GGG tri-receptor agonist herein, or a pharmaceutically acceptable salt thereof which, upon single or multiple dose administration to an individual in need thereof, provides a desired effect in such an individual under diagnosis or treatment (i.e., may produce a clinically measurable difference in a condition of the individual such as, for example, a reduction in blood glucose, a reduction in HbA1c, a reduction in weight or body fat and/or a change body composition). An effective amount can be readily determined by one of skill in the art by using known techniques and by observing results obtained under analogous circumstances. In determining the effective amount for an individual, a number of factors are considered, including, but not limited to, the species of mammal, its size, age and general health, the specific disease or disorder involved, the degree of or involvement or the severity of the disease or disorder, the response of the individual, the GGG tri-receptor agonist administered, the mode of administration, the bioavailability characteristics of the preparation administered, the dose regimen selected, the use of concomitant medication, and other relevant circumstances.

As used herein, "fasting glucose" means a blood sugar level from a sample of blood taken after an individual fasts for at least about 8 hours.

As used herein, "glycemic control" means a maintenance or a reduction of an individual's HbA1c levels. Likewise, "improving" and/or "improved" glycemic control means reductions in HbA1c. Moreover, "in need of further" glycemic control means a need for reductions in HbA1c.

As used herein, "hemoglobin A1c" or "HbA1c" means glycated hemoglobin and its levels, which develop when hemoglobin joins with glucose in the blood. HbA1c levels are a commonly used measure of glycemic control in individuals with diabetes, with decreased HbA1c levels generally indicating improved glycemic control. In the context of the disclosure, the doses, regimens and methods here result in a decrease in HbA1c. In certain instances, the decrease in HbA1c is decreased relative to the HbA1c levels resulting from an existing treatment with the same or even a different GGG tri-receptor agonist, including other GGG tri-receptor agonists.

As used herein, "incretin analog" means a compound having structural similarities with, but multiple differences from, each of GIP, GLP-1 and GCG, especially human GIP, human GLP-1 and human GCG. The incretin analogs herein include amino acid sequences resulting in the compounds having affinity for and activity at each of the GIP, GLP-1 and GCG receptors (i.e., triple receptor agonist activity). Exemplary incretin analogs and sequences for human GIP, GLP-1 and GCG for use herein are described in Intl. Patent Application Publication Nos. WO 2019/125929 and WO 2019/125938, as well as Intl. Patent Application No. PCT/US2020/064512. Of particular use herein is the GGG tri-receptor agonist in Example 12 of Intl. Patent Application Publication No. WO 2019/125938, which has the following sequence:

YX$_2$QGTFTSDYSIX$_{13}$LDKX$_{17}$AX$_{19}$X$_{20}$AFIE-YLLX$_{28}$X$_{29}$GPSSX$_{34}$APPPS, where X$_2$ is Aib, X$_{13}$ is αMeL, X$_{17}$ is K, X$_{19}$ is Q, X$_{20}$ is Aib, X$_{28}$ is E, X$_{29}$ is G and X$_{34}$ is G, where the K at X$_{17}$ is chemically modified through conjugation to the epsilon amino group of the K side-chain with (2-[2-(2-aminoethoxy)-ethoxy]-acetyl)-(γGlu)-CO-(CH$_2$)$_{18}$CO$_2$H, and where the C-terminal amino acid is amidated as a C-terminal primary amide (SEQ ID NO:1), including any protein that is the subject of a regulatory submission seeking approval of a GGG tri-receptor agonist product that relies in whole or part upon data submitted to a regulatory agency by Eli Lilly and Company relating to this incretin analog, regardless of whether the party seeking approval of the product actually identifies the incretin analog as a GGG tri-receptor agonist or uses some other term.

Below is a depiction of the structure of the GGG tri-receptor analog of SEQ ID NO: 1 using the standard single letter amino acid codes with the exception of residues Aib2, αMeL13, K17 and Aib20, where the structures of these amino acid residues have been expanded:

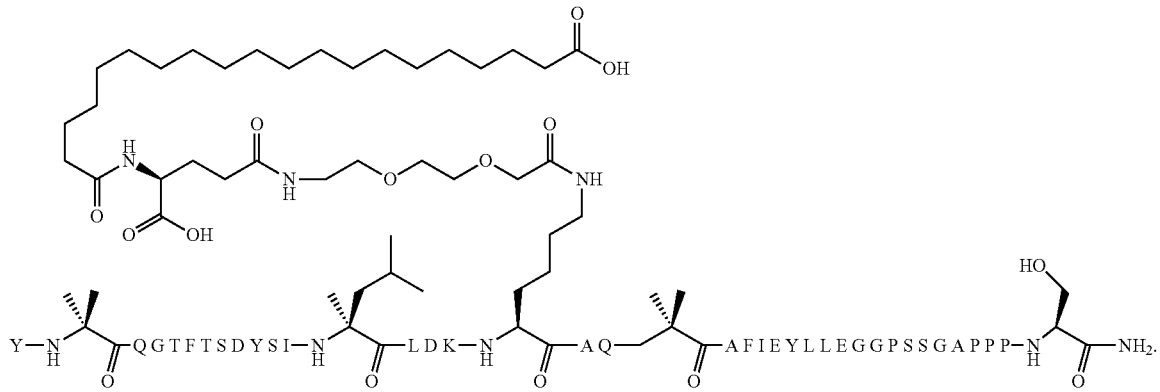

As used herein, "individual in need thereof" means a mammal, such as a human, with a condition, disease, disorder or symptom requiring treatment or therapy, including, for example, those listed herein. In particular, the preferred individual to be treated is a human.

As used herein, "loading dose" means a first dose of a therapeutic agent, such as a GGG tri-receptor agonist, administered to an individual that is larger than a dose that would be expected to be used for long-term or maintenance treatment. Stated differently, a loading dose is a single dose of a therapeutic agent that is greater than the expected weekly maintenance dose by a factor that is about equal to an amount that a peak plasma concentration is greater after administration of a sufficient number of once-weekly doses of the expected maintenance doses to reach steady-state as compared to a peak serum concentration following administration of a single dose of the expected weekly maintenance dose.

As used herein, "expected weekly maintenance dose" means a dose of a therapeutic agent, such as a GGG tri-receptor agonist, suitable for once-weekly dosing that would be expected to be needed to provide glycemic control or weight management in a given individual based on factors including, but not limited to, the individual's FG, HbA1c, frequency and severity of hypoglycemia and other AEs, and/or BW.

As used herein, "maintenance dose" means any weekly dose of a therapeutic agent, such as a GGG tri-receptor agonist suitable for once-weekly dosing, other than a loading dose.

As used herein, "obese" or "obesity" means, with regard to an individual, one having a BMI≥30 kg/m$^2$.

As used herein, "overweight" means, with regard to an individual, one having a BMI of ≥27 kg/m$^2$ but <30 kg/m$^2$.

As used herein, "treat," "treating," "to treat" and the like mean restraining, slowing, stopping or reversing the progression or severity of an existing condition, disease, disorder or symptom. Exemplary conditions, diseases, disorders and symptoms include, but are not limited to, treating T2DM, improving glycemic control, inducing regression or remission of diabetes, preventing progression to diabetes, improving weight management, treating obesity, improving dyslipidemia, treating chronic kidney disease, treating diabetic kidney disease, treating atherosclerotic heart disease, treating heart failure with preserved ejection fraction (HFpEF) or heart failure with reduced ejection fraction (HFrEF), treating nonalcoholic fatty liver disease, treating nonalcoholic steatohepatitis, treating hepatic cirrhosis, treating obstructive sleep apnea, treating obesity related disorders and/or complications, treating osteoarthritis and treating polycystic ovary syndrome.

As used herein, and with reference to an incretin analog, "triple receptor agonist activity" means an incretin analog with activity at each of the GIP, GLP-1 and GCG receptors, especially an analog having a balanced and sufficient activity at each receptor to provide the benefits of agonism of that receptor while avoiding unwanted side effects associated with too much activity of that receptor. Moreover, the incretin analogs having triple receptor agonist activity have extended duration of action at each of the GIP, GLP-1 and GCG receptors, which advantageously allows for dosing as infrequently as once-a-day, thrice-weekly, twice-weekly or once-a-week.

As used herein, "weight management" means a reduction in body weight and/or change in body fat composition.

Compositions

The compositions herein include an GGG tri-receptor agonist having a structure of, for example, SEQ ID NO:1. The GGG tri-receptor agonist can be recombinantly produced or synthetically produced (see, e.g., Intl. Patent Application Publication Nos. WO 2019/125929, WO 2019/125938, as well as Intl. Patent Application No. PCT/US2020/064512). Formulations for the GGG tri-receptor that can be used herein are disclosed in U.S. Provisional Patent Application No. 63/164,702 (filed 23 Mar. 2021).

In some instances, the compositions herein are formulated to include a dose of the GGG tri-receptor agonist from about 0.5 mg to about 12.0 mg. In other instances, the dose of the GGG tri-receptor agonist can be from about 1.0 mg to about 11.5 mg, from about 1.5 mg to about 11.0 mg, from about 2.0 mg to about 10.5 mg, from about 2.5 mg to about 10.0 mg, from about 3.0 mg to about 9.5 mg, from about 3.5 mg to about 9.0 mg, from about 4.0 mg to about 8.5 mg, from about 4.5 mg to about 8.0 mg, from about 5.0 mg to about 7.5 mg, from about 5.5 mg to about 7.0 mg, or from about 6.0 mg to about 6.5 mg. In other instances, the dose of the GGG tri-receptor agonist can be from about 1.0 mg to about 2.0 mg, from about 2.0 mg to about 3.0 mg, from about 3.0 mg to about 4.0 mg, from about 4.0 to about 5.0 mg, from about 5.0 mg to about 6.0 mg, from about 6.0 mg to about 7.0 mg, from about 7.0 mg to about 8.0 mg, from about 8.0 mg to about 9.0 mg, from about 9.0 mg to about 10.0 mg, from about 10.0 mg to about 11.0 mg, or from about 11.0 mg to about 12.0 mg. In other instances, the dose of the GGG tri-receptor agonist can be about 0.5 mg, about 1.0 mg, about 1.5 mg, about 2.0 mg, about 2.5 mg, about 3.0 mg, about 3.5 mg, about 4.0 mg, about 4.5 mg, about 5.0 mg, about 5.5 mg, about 6.0 mg, about 6.5 mg, about 7.0 mg, about 7.5 mg, about 8.0 mg, about 8.5 mg, about 9.0 mg, about 9.5 mg, about 10.0 mg, about 10.5 mg, about 11.0 mg, about 11.5 mg, or about 12.0 mg. Alternatively, the dose of the GGG tri-receptor agonist is ≤12.0 mg. In certain instances, the dose of the GGG tri-receptor agonist can be from about 0.5 mg to about 4.0 mg, from about 2.0 mg to about 8.0 mg, or from about 8.0 mg to about 12.0 mg.

The compositions herein can be administered intravenously (IV), intramuscularly (IM) or subcutaneously (SC), especially SC. The compositions may be provided lyophilized and then reconstituted or as a solution formulation administered using a pre-filled, disposable pen, reusable pen, or automatic pen injector. Alternatively, the compositions may be administered using a multi-use vial or a pump device. In some instances, the device is an automatic injection apparatus as described in U.S. Pat. No. 8,734,394.

The compositions herein therefore may be presented in a pre-filled syringe/multi-use vial. Such pre-filled syringe/multi-use vial may be useful for administering about 0.5 mL to about 1.0 mL of the composition per patient per dose. The dose of the composition may be administered using a dosing schedule determined by a clinician, physician or other trained medical professional.

Alternatively, the composition can be prepared for a cartridge and therefore will differ from the above composition by including a preservative.

Alternatively, the composition can be prepared as part of an article of manufacture comprising the composition, where the article of manufacture can be a multi-use vial, a reusable pen injector, a pre-filled, disposable pen, an auto-injector or a pump.

In view of the above, the compositions herein are associated with acceptable shelf-life stability, in-use stability and acceptable injection site experience.

Methods

The GGG tri-receptor agonist herein may be used for treating a variety of conditions, disorders, diseases or symptoms. For example, the GGG tri-receptor agonist herein may be used for improving glycemic control, providing chronic weight management, as well as treating diabetes mellitus (especially T2DM), dyslipidemia, metabolic syndrome, NAFLD, NASH, obesity, obstructive sleep apnea, osteoarthritis, polycystic ovary syndrome and/or chronic kidney disease.

The methods can include the steps described herein, and these maybe be, but not necessarily, carried out in the sequence as described. Other sequences, however, also are conceivable. Moreover, individual or multiple steps may be carried out either in parallel and/or overlapping in time and/or individually or in multiply repeated steps. Some steps may be omitted. Furthermore, the methods may include additional, unspecified steps.

While the details of each method are provided below, each can include a step of selecting an individual who has or is predisposed to having diabetes, especially T2DM, and/or has or is predisposed to being overweight or obese.

In one aspect, provided herein are methods for improving glycemic control in an individual, where such methods include administering to the individual a first once weekly dose of a GGG tri-receptor agonist (i.e., incretin analog) comprising SEQ ID NO: 1 for at least 1 week, where the first once weekly dose is from about 0.5 mg to about 4.0 mg. In some instances, the first dose is administered once weekly for at least about 1 week, once weekly for at least about 2 weeks or once weekly for at least about 4 weeks. In some instances, the first dose is administered once weekly for about 1 week, once weekly for about 2 weeks, once weekly for about 3 weeks, or once weekly for about 4 weeks. In some instances, the first once weekly dose is 1.0 mg, 2.0 mg, 3.0 or 4.0 mg. In some instances, the first once weekly dose is 1.0 mg, 2.0 mg or 4.0 mg. In some instances, the first once weekly dose is selected from about 1.0 mg to about 2.0 mg. In some instances, the first once weekly dose is about 1.0 mg or about 2.0 mg. In some instances, the first dose is 1.0 mg. In some instances, the first dose is 2.0 mg.

In some embodiments, the methods also include a step of administering to the individual a second once weekly dose of the GGG tri-receptor agonist for at least 1 week. In some instances, the second dose is administered once weekly for at least about 1 week, once weekly for at least about 2 weeks or once weekly for at least about 4 weeks. In some instances, the second dose is administered once weekly for about 1 week, once weekly for about 2 weeks, once weekly for about 3 weeks, or once weekly for about 4 weeks. In some instances, the second once weekly dose is less than the first once weekly dose. Alternatively, the second once weekly dose is the same as the first once weekly dose. Alternatively, the second once weekly dose is greater than the first once weekly dose. In some instances, the second once weekly dose is from about 2.0 mg to about 8.0 mg. In certain instances, the second once weekly dose is 2.0 mg, 3.0 mg, 4.0 mg, 6.0 mg or 8.0 mg. In some instances, the second once weekly dose is selected from about 2.0 mg to about 4.0 mg. In some instances, the second once weekly dose is 2.0 mg, 3.0 mg or 4.0 mg. In some instances, the second once weekly dose is 4.0 mg.

In some embodiments, the methods also include a step of administering to the individual a third once weekly dose of the GGG tri-receptor agonist for at least 1 week. In some instances, the third dose is administered once weekly for at least about 1 week, once weekly for at least about 2 weeks, once weekly for at least about 4 weeks, once weekly for at least about 6 weeks, or once weekly for at least about 8 weeks or more. In some instances, the third dose is administered once weekly for about 1 week, once weekly for about 2 weeks, once weekly for about 3 weeks, once weekly for about 4 weeks, once weekly for about 6 weeks, once weekly for about 8 weeks or more. In some instances, the third once weekly dose can be less than the second once weekly dose. Alternatively, the third once weekly dose can be the same as the second once weekly dose. Alternatively, the third once weekly dose can be greater than the second once weekly dose. In some instances, the third once weekly dose is from about 4.0 mg to about 12.0 mg. In certain instances, the third once weekly dose is 4.0 mg, 6.0 mg, 8.0 mg, 10.0 mg or 12.0 mg. In some instances, the third once weekly dose is selected from about 4.0 mg to about 8.0 mg. In some instances, the third once weekly dose is 4.0 mg, 6.0 mg or 8.0 mg. In some instances, the third once weekly dose is 6.0 mg or 8.0 mg. In some instances, the third once weekly dose is 6.0 mg. In some instances, the third once weekly dose is 8.0 mg.

In some embodiments, the methods also include a step of administering to the individual a fourth once weekly dose of the GGG tri-receptor agonist for at least 1 week. In some instances, the fourth dose is administered once weekly for at least about 1 week, once weekly for at least about 2 weeks, once weekly for at least about 4 weeks, once weekly for at least about 6 weeks, or once weekly for at least about 8 weeks or more. In some instances, the fourth dose is administered once weekly for about 1 week, once weekly for about 2 weeks, once weekly for about 3 weeks, once weekly for about 4 weeks, once weekly for about 6 weeks, or once weekly for about 8 weeks or more. In some instances, the fourth once weekly dose can be less than the third once weekly dose. Alternatively, the fourth once weekly dose can be the same as the third once weekly dose. Alternatively, the fourth once weekly dose can be greater than the third once weekly dose. In some instances, the fourth once weekly dose is from about 6.0 mg to about 12.0 mg. In certain instances, the fourth once weekly dose is 6.0 mg, 8.0 mg, 9.0 mg, 10.0 mg, 11.0 mg or 12.0 mg. In some instances, the fourth once weekly dose is 6.0 mg, 8.0 mg, 9.0 mg, 10.0 mg or 12.0 mg. In some instances, the fourth once weekly dose is 9.0 mg. In some instances, the fourth dose once weekly is 12.0 mg.

In some embodiments, the methods also include a step of administering to the individual a fifth once weekly dose of the GGG tri-receptor agonist for at least 1 week. In some instances, the fifth dose is administered once weekly for at least about 1 week, once weekly for at least about 2 weeks, once weekly for at least about 4 weeks, once weekly for at least about 6 weeks, or once weekly for at least about 8 weeks or more. In some instances, the fifth dose is administered once weekly for about 1 week, once weekly for about 2 weeks, once weekly for about 3 weeks, once weekly for about 4 weeks, once weekly for about 6 weeks, or once weekly for about 8 weeks or more. In some instances, the fifth once weekly dose can be less than the fourth once weekly dose. Alternatively, the fifth once weekly dose can be the same as the fourth once weekly dose. Alternatively, the fifth once weekly dose can be greater than the fourth once weekly dose. In some instances, the fifth once weekly dose is from about 8.0 mg to about 12.0 mg. In certain instances, the fifth once weekly dose is 8.0 mg, 9.0 mg, 10.0 mg, 11.0 mg or 12.0. In some instances, the fifth once weekly dose is 8.0 mg, 10.0 mg or 12.0 mg. In some instances, the fifth once weekly dose is 12.0 mg.

In some embodiments, the methods also include administering to the individual additional doses, such as a sixth once weekly dose, or a seventh once weekly dose, or more. The additional dose may be less, the same or greater than the previous administered dose.

For instance, in some embodiments, the methods include administering to the individual a first once weekly dose selected from about 1.0 mg to about 2.0 mg, a second once weekly dose selected from about 2.0 mg to about 4.0 mg, a third once weekly dose selected from about 4.0 mg to about 8.0 mg, and a fourth once weekly dose selected from about 6.0 mg to about 12.0 mg.

In some embodiments, the methods include administering to the individual a first once weekly dose selected from about 1.0 mg to about 2.0 mg, a second once weekly dose selected from about 2.0 mg to about 4.0 mg, a third once weekly dose selected from about 4.0 mg to 8.0 mg, a fourth once weekly dose selected from about 6.0 mg to about 12.0 mg, and a fifth once weekly dose selected from about 8.0 mg to about 12.0 mg.

In some embodiments, the methods include administering to the individual a first once weekly dose selected from about 1.0 mg to about 2.0 mg, a second once weekly dose selected from about 2.0 mg to about 4.0 mg, a third once weekly dose selected from about 4.0 mg to about 8.0 mg, a fourth once weekly dose selected from about 6.0 mg to about 12.0 mg, a fifth once weekly dose selected from about 8.0 mg to about 12.0 mg, and a sixth once weekly dose selected from about 10.0 mg to about 12.0 mg.

In some embodiments, the methods include administering to the individual a first once weekly dose selected from about 1.0 mg to about 2.0 mg, a second once weekly dose selected from about 2.0 mg to about 4.0 mg, a third once weekly dose selected from about 4.0 mg to about 8.0 mg, a fourth once weekly dose selected from about 6.0 mg to about 12.0 mg, a fifth once weekly dose selected from about 8.0 mg to about 12.0 mg, a sixth once weekly dose selected from about 10.0 mg to about 12.0 mg, and a seventh once weekly dose of 12.0 mg.

In various embodiments, the first once weekly dose is selected from 1.0 or 2.0 mg, the second once weekly dose is selected from 2.0, 3.0 or 4.0 mg, the third once weekly dose is selected from 4.0, 6.0 or 8.0 mg, the fourth once weekly dose is selected from 6.0, 8.0, 9.0, 10.0 or 12.0 mg, the fifth once weekly dose is selected from 8.0, 10.0 or 12.0 mg, the sixth once weekly dose is selected from 10.0 or 12.0 mg, and the seventh once weekly dose is 12.0 mg.

In some embodiments, each once weekly dose is administered for at least about 2 weeks. In some embodiments, each once weekly dose is administered for at least about 4 weeks. In some embodiments, each once weekly dose is administered for about 2 weeks. In some embodiments, each once weekly dose is administered for about 4 weeks.

For instance, in some embodiments, the methods include administering to the individual a first once weekly dose of about 2.0 mg for at least about 4 weeks, a second once weekly dose of about 4.0 mg for at least about 4 weeks, a third once weekly dose of about 8.0 mg for at least about 4 weeks, and a fourth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 8.0 mg for at least about 4 weeks, a fourth once weekly dose of about 10.0 mg for at least about 4 weeks, and a fifth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 6.0 mg for at least about 4 weeks, a fourth once weekly dose of about 8.0 mg for at least about 4 weeks, a fifth once weekly dose of about 10.0 mg for at least about 4 weeks and a sixth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 6.0 mg for at least about 4 weeks, a fourth once weekly dose of about 9.0 mg for at least about 4 weeks and a fifth once weekly dose of about 12.0 mg for at least about 4 weeks.

In some embodiments, the methods include administering to the individual a first once weekly dose of about 1.0 mg for at least about 4 weeks, a second once weekly dose of about 3.0 mg for at least about 4 weeks, a third once weekly dose of about 6.0 mg for at least about 4 weeks, a fourth once weekly dose of about 9.0 mg for at least about 4 weeks and a fifth once weekly dose of about 12.0 mg for at least about 4 weeks.

In some embodiments, the methods include administering to the individual a first once weekly dose of about 1.0 mg for at least about 4 weeks, a second once weekly dose of about 2.0 mg for at least about 4 weeks, a third once weekly dose of about 4.0 mg for at least about 4 weeks, a fourth once weekly dose of about 6.0 mg for at least about 4 weeks, a fifth once weekly dose of about 8.0 mg for at least about 4 weeks, a sixth once weekly dose of about 10.0 mg for at least about 4 weeks and a seventh once weekly dose of about 12.0 mg for at least about 4 weeks.

The above embodiments are provided as examples only and are not meant to exclude other or additional embodiments. For instance, in some embodiments, one or more dosing steps as shown above may be omitted or one or more new dosing steps may be introduced based on efficacy, safety and tolerability considerations for the individual.

In some instances, improving glycemic control comprises reducing the individual's level of Hb1Ac below 7%, below 6.5%, or below 6.0%.

In some instances, the individual initially has a body mass index (BMI) of $\geq 27$ kg/m$^2$ but <30 kg/m$^2$. In some instances, the individual initially has a BMI of $\geq 30$ kg/m$^2$. In some instances, the individual has type 2 diabetes. In some instances, the individual has obesity.

In some instances, the methods can also include a step of measuring at least one of the individual's FG or HbA1c or both during dose administering. Methods of measuring FG and HbA1c are well known to one of skill in the art and need not be exhaustively described. The methods can also include a step of recording the individual's frequency and severity of hypoglycemia and optionally other AEs during dose administering. In some instances, the AEs can be diarrhea, emesis, GI discomfort and nausea. The methods can also include a step of determining doses of the GGG tri-receptor agonist from the individual's FG and/or HbA1c and/or from the individual's frequency and severity of hypoglycemia and optionally other AEs.

In another aspect, provided herein is a GGG tri-receptor agonist comprising SEQ ID NO: 1 for use in improving glycemic control in an individual, wherein a first once weekly dose of the GGG tri-receptor agonist is administered for at least 1 week and wherein the first once weekly dose is from about 0.5 mg to about 4.0 mg.

In some embodiments, a second once weekly dose of the GGG tri-receptor agonist is administered for at least 1 week. In some instances, the second once weekly dose is from about 2.0 mg to about 8.0 mg. In some instances, the second once weekly dose is less than the first once weekly dose. Alternatively, the second once weekly dose is the same as the first once weekly dose. Alternatively, the second once weekly dose is greater than the first once weekly dose.

In some embodiments, a third once weekly dose of the GGG tri-receptor agonist is administered for at least 1 week. In some instances, the third once weekly dose is from about 4.0 mg to about 12.0 mg. In some instances, the third once weekly dose can be less than the second once weekly dose. Alternatively, the third once weekly dose can be the same as the second once weekly dose. Alternatively, the third once weekly dose can be greater than the second once weekly dose.

In some embodiments, a fourth once weekly dose of the GGG tri-receptor agonist is administered for at least 1 week. In some instances, the fourth once weekly dose is from about 6.0 mg to about 12.0 mg. In some instances, the fourth once weekly dose can be less than the third once weekly dose. Alternatively, the fourth once weekly dose can be the same as the third once weekly dose. Alternatively, the fourth once weekly dose can be greater than the third once weekly dose.

In some embodiments, a fifth once weekly dose of the GGG tri-receptor agonist is administered for at least 1 week. In some instances, the fifth once weekly dose is from about 8.0 mg to about 12.0 mg. In some instances, the fifth once weekly dose can be less than the fourth once weekly dose. Alternatively, the fifth once weekly dose can be the same as the fourth once weekly dose. Alternatively, the fifth once weekly dose can be greater than the fourth once weekly dose.

In some embodiments, additional doses, such as a sixth once weekly dose, or a seventh once weekly dose, or more may be administered for at least 1 week. The additional dose may be less, the same or greater than the previous administered dose.

In various embodiments, the first once weekly dose is selected from about 1.0 mg to about 2.0 mg, the second once weekly dose is selected from about 2.0 mg to about 4.0 mg, the third once weekly dose is selected from about 4.0 mg to about 8.0 mg, and the fourth once weekly dose is selected from about 6.0 mg to about 12.0 mg, and the fifth once weekly dose is selected from about 8.0 mg to 12.0 mg. In some embodiments, a sixth once weekly dose selected from about 10.0 mg to about 12.0 mg is administered. In some embodiments, a seventh once weekly dose of about 12.0 mg is administered.

In some embodiments, the first once weekly dose is 2.0 mg, the second once weekly dose is 4.0 mg, the third once weekly dose is 8.0 mg, and the fourth once weekly dose is 12.0 mg. In some embodiments, the first once weekly dose is 2.0 mg, the second once weekly dose is 4.0 mg, the third once weekly dose is 6.0 mg, the fourth once weekly dose is 9.0 mg, and the fifth once weekly dose is 12.0 mg.

In some embodiments, each once weekly dose is administered for at least about 2 weeks. In some embodiments, each once weekly dose is administered for at least about 4 weeks.

In another aspect, provided herein is a use of a GGG tri-receptor agonist comprising SEQ ID NO:1 in the manufacture of a medicament for improving glycemic control in an individual, wherein a first once weekly dose of the GGG tri-receptor agonist is administered for at least 1 week, and wherein the first dose is from about 0.5 mg to 4.0 mg. In some embodiments, a second once weekly dose of the GGG tri-receptor agonist is administered for at least 1 week. In some embodiments, a third once weekly dose of the GGG tri-receptor agonist is administered for at least 1 week. In some embodiments, a fourth once weekly dose of the GGG tri-receptor agonist is administered for at least 1 week. In some embodiments, a fifth once weekly dose of the GGG tri-receptor agonist is administered for at least 1 week.

In some embodiments, the first once weekly dose is 2.0 mg, the second once weekly dose is 4.0 mg, the third once weekly dose is 8.0 mg, and the fourth once weekly dose is 12.0 mg. In some embodiments, the first once weekly dose is 2.0 mg, the second once weekly dose is 4.0 mg, the third once weekly dose is 6.0 mg, the fourth once weekly dose is 9.0 mg, and the fifth once weekly dose is 12.0 mg.

In another aspect, methods are provided herein for improving glycemic control in an individual, comprising administering to the individual a first once weekly dose of a GGG tri-receptor agonist comprising SEQ ID NO:1, wherein the first once weekly dose is from about 0.5 mg to about 4.0 mg and is administered for at least 1 week; and increasing the first once weekly dose by increments of about 1.0 mg to about 4.0 mg to a once weekly dose of ≤12.0 mg, wherein each increased once weekly dose is administered for at least 1 week.

In some embodiments, the first once weekly dose is 1.0 mg, 2.0 mg, 3.0 mg or 4.0 mg. In some embodiments, the first once weekly dose is 1.0 mg or 2.0 mg. In some embodiments, the first once weekly dose is 1.0 mg. In some embodiments, the first once weekly dose is 2.0 mg.

In some embodiments, the first once weekly dose and each increased once weekly dose thereafter is increased in an increment of about 1.0 mg, about 2.0 mg, about 3.0 mg or about 4.0 mg to reach a once weekly dose of ≤12.0 mg. The increments in a dosing schedule may be the same or different. For instance, a dose may be increased by 2.0 mg and the next or subsequent dose may be further increased by the same increment of 2.0 mg, or by a different increment such as 1.0 mg, 3.0 or 4.0 mg.

The first dose and each increased dose are administered once weekly for at least 1 week. In some instances, the first once weekly dose and each increased once weekly dose are administered once weekly for at least 2 weeks, once weekly for at least 3 weeks, or once weekly for at least 4 weeks. In some instances, the first once weekly dose and each increased once weekly dose are administered once weekly for at least 4 weeks. In some instances, the first once weekly dose and each increased once weekly dose are administered once weekly for about 2 weeks, once weekly for about 3 weeks, or once weekly for about 4 weeks. In some instances, the first once weekly dose and each increased once weekly dose are administered once weekly for about 4 weeks. In some instances, the first once weekly dose and subsequent increased once weekly doses are administered once weekly for about 4 weeks until a once weekly dose ≤12.0 mg is reached.

In some embodiments, the first once weekly dose is 1.0 mg, and the increased once weekly doses are selected from 2.0, 3.0, 4.0, 5.0, 6.0, 7.0, 8.0, 9.0, 10.0, 11.0 or 12.0 mg. In some embodiments, the first once weekly dose is 2.0 mg, and the increased once weekly doses are selected from 3.0, 4.0, 5.0, 6.0, 7.0, 8.0, 9.0, 10.0, 11.0 or 12.0 mg.

For instance, if the first once weekly dose is 1.0 mg, the next increased once weekly dose can be 2.0, 3.0, 4.0 or 5.0 mg. If the first once weekly dose is 1.0 mg and the next increased once weekly dose is 3.0 mg, then the next increased once weekly dose can be 4.0, 5.0, 6.0 or 7.0 mg. If the first once weekly dose is 1.0 mg and the next increased once weekly doses are 3.0 mg and 6.0 mg, then the next increased once weekly dose can be 7.0, 8.0, 9.0 or 10.0 mg. If the first once weekly dose is 1.0 mg and the next increased once weekly doses are 3.0, 6.0 and 9.0 mg, then the next increased once weekly dose can be 10.0, 11.0 or 12.0 mg. If the first once weekly dose is 1.0 mg and the next increased once weekly doses are 3.0, 6.0, 9.0 and 10.0 mg, then the next increased once weekly dose can be 11.0 mg, or 12.0 mg.

In another instance, if the first once weekly dose is 2.0 mg, the next increased once weekly dose can be 3.0, 4.0, 5.0 or 6.0 mg. If the first once weekly dose is 2.0 mg and the next increased once weekly dose is 4.0 mg, then the next increased once weekly dose can be 5.0, 6.0, 7.0 or 8.0 mg. If the first once weekly dose is 2.0 mg and the next increased once weekly doses are 4.0 mg and 6.0 mg, then the next increased once weekly dose can be 7.0, 8.0, 9.0 or 10.0 mg. If the first once weekly dose is 2.0 mg, and the next increased once weekly doses are 4.0, 6.0 and 9.0 mg, then the next increased once weekly dose can be 10.0, 11.0, or 12.0 mg.

In some embodiments, the first once weekly dose is 1.0 or 2.0 mg, and the next or first increased once weekly dose is selected from 2.0, 3.0 or 4.0 mg. In some embodiments, the next or second increased once weekly dose is selected from 4.0, 6.0 or 8.0 mg. In some embodiments, the next or third increased once weekly dose is selected from 6.0, 8.0, 9.0, 10.0 or 12.0 mg. In some embodiments, the next or fourth increased once weekly dose is selected from 8.0, 10.0 or 12.0 mg. In some embodiments, the next or fifth increased once weekly dose is selected from 10.0 or 12.0 mg. In some embodiments, the next or sixth increased once weekly dose is 12.0 mg.

In some embodiments, the first once weekly dose is 2.0 mg, and the increased weekly doses are 4.0, 8.0 and 12.0 mg. Thus, the first once weekly dose is 2.0 mg, the next or first increased once weekly dose is 4.0 mg, the next or second increased once weekly dose is 8.0 mg, and the next or third increased once weekly dose is 12.0 mg.

In some embodiments, the first once weekly dose is 2.0 mg, and the increased weekly doses are 4.0, 8.0, 10.0 and 12.0 mg. Thus, the first once weekly dose is 2.0 mg, the next or first increased once weekly dose is 4.0 mg, the next or second increased once weekly dose is 8.0 mg, the next or third increased once weekly dose is 10.0 mg, and the next or fourth increased once weekly dose is 12.0 mg.

In some embodiments, the first once weekly dose is 2.0 mg, and the increased weekly doses are 4.0, 6.0, 8.0, 10.0 and 12.0 mg. Thus, the first once weekly dose is 2.0 mg, the next or first increased once weekly dose is 4.0 mg, the next or second increased once weekly dose is 6.0 mg, the next or third increased once weekly dose is 8.0 mg, the next or fourth increased once weekly dose is 10.0 mg, and the next or fifth increased once weekly dose is 12.0 mg.

In some embodiments, the first once weekly dose is 2.0 mg, and the increased weekly doses are 4.0, 6.0, 9.0 and 12.0 mg. Thus, the first once weekly dose is 2.0 mg, the next or first increased once weekly dose is 4.0 mg, the next or second increased once weekly dose is 6.0 mg, the next or third increased once weekly dose is 9.0 mg, and the next or fourth increased once weekly dose is 12.0 mg.

In some embodiments, the first once weekly dose is 1.0 mg, and the increased weekly doses are 3.0, 6.0, 9.0 and 12.0 mg. Thus, the first once weekly dose is 1.0 mg, the next or first increased once weekly dose is 3.0 mg, the next or second increased once weekly dose is 6.0 mg, the next or third increased once weekly dose is 9.0 mg, and the next or fourth increased once weekly dose is 12.0 mg.

In some embodiments, the first once weekly dose is 1.0 mg, and the increased weekly doses are 2.0, 4.0, 6.0, 8.0, 10.0 and 12.0 mg. Thus, the first once weekly dose is 1.0 mg, the next or first increased once weekly dose is 2.0 mg, the next or second increased once weekly dose is 4.0 mg, the next or third increased once weekly dose is 6.0 mg, the next or fourth increased once weekly dose is 8.0 mg, the next or fifth increased once weekly dose is 10.0 mg, and the next or sixth increased once weekly dose is 12.0 mg.

Starting doses, increments and/or the number of steps to reach a maximum dose of ≤12.0 may be adjusted in view of efficacy, safety and tolerability for the individual.

In some instances, the individual initially has a body mass index (BMI) of ≥27 kg/m² but <30 kg/m². In some instances, the individual initially has a BMI of ≥30 kg/m². In some instances, the individual has type 2 diabetes. In some instances, the individual has obesity.

In another aspect, provided herein is a GGG tri-receptor agonist comprising SEQ ID NO: 1 for use in improving glycemic control in an individual, wherein a first once weekly dose of the GGG tri-receptor agonist is from about 0.5 mg to about 4.0 mg and is administered for at least 1 week, and wherein the first once weekly dose is increased by increments of about 1.0 mg to about 4.0 mg to a once weekly dose of ≤12.0 mg, and wherein each increased once weekly dose is administered for at least 1 week.

In some embodiments, the first once weekly dose and the increased once weekly doses are administered once weekly for at least about two weeks. In some embodiments, the first once weekly dose and the increased once weekly doses are administered once weekly for at least about four weeks. In some embodiments, the first once weekly dose and the increased once weekly doses are administered once weekly for about two weeks. In some embodiments, the first once weekly dose and the increased once weekly doses are administered once weekly for about four weeks. In some instances, the first once weekly dose and subsequent increased once weekly doses are administered once weekly for about 4 weeks until a once weekly dose of ≤12.0 mg is reached.

In some embodiments, the first once weekly dose is selected from 1.0 or 2.0 mg. In some embodiments, the increased once weekly doses are selected from 2.0, 3.0, 4.0, 6.0, 8.0, 9.0, 10.0, 11.0 or 12.0 mg.

In some embodiments, the first once weekly dose is 2.0 mg, and the increased weekly doses are 4.0, 8.0 and 12.0 mg. In some embodiments, the first once weekly dose is 2.0 mg, and the increased once weekly doses are 4.0, 6.0, 9.0 and 12.0 mg. In some embodiments, the first once weekly dose is 2.0 mg, and the increased weekly doses are 4.0, 8.0, 10.0 and 12.0 mg. In some embodiments, the first once weekly dose is 2.0 mg, and the increased weekly doses are 4.0, 6.0, 8.0, 10.0 and 12.0 mg. In some embodiments, the first once weekly dose is 1.0 mg, and the increased weekly doses are 3.0, 6.0, 9.0 and 12.0 mg. In some embodiments, the first once weekly dose is 1.0 mg, and the increased weekly doses are 2.0, 4.0, 6.0, 8.0, 10.0 and 12.0 mg.

In another aspect, provided herein is a use of a GGG tri-receptor agonist comprising SEQ ID NO:1 in the manufacture of a medicament for improving glycemic control in an individual, wherein a first once weekly dose of the GGG tri-receptor agonist is from about 0.5 mg to about 4.0 mg and is administered for at least 1 week, and wherein the first once weekly dose is increased by increments of about 1.0 mg to about 4.0 mg to a once weekly dose of ≤12.0 mg, and wherein each increased once weekly dose is administered for at least 1 week.

In another aspect, provided herein are methods for improving glycemic control in an individual, where such methods include a step (a) of administering to the individual from about 0.5 mg to about 4.0 mg of a GGG tri-receptor agonist comprising SEQ ID NO:1 suitable for once-weekly dosing for at least 1 week. In some instances, the GGG tri-receptor agonist is administered once weekly for 1 week, once weekly for 2 weeks, or once weekly for 4 weeks, a step (b) of administering to the individual from about 2.0 mg to about 8.0 mg of the GGG tri-receptor agonist once weekly for at least 1 week, and a step (c) of administering to the individual from about 8.0 mg to about 12.0 mg of the GGG tri-receptor agonist once weekly for at least 1 week.

In some instances, the individual initially has a body mass index (BMI) of ≥27 kg/m² but <30 kg/m². In some instances, the individual initially has a BMI of ≥30 kg/m². In some instances, the individual has type 2 diabetes. In some instances, the individual has obesity.

In another aspect, provided herein is a GGG tri-receptor agonist comprising SEQ ID NO: 1 suitable for once-weekly dosing for use in improving glycemic control in an individual, wherein a dose of the GGG tri-receptor agonist from about 0.5 mg to about 4.0 mg is administered for at least 1 week, followed by a dose of the GGG tri-receptor agonist from about 2.0 mg to about 8.0 mg for at least 1 week, followed by a dose of the GGG tri-receptor agonist from about 8.0 mg to about 12.0 mg for at least 1 week.

In another aspect, provided herein is a use of a GGG tri-receptor agonist comprising SEQ ID NO: 1 suitable for once-weekly dosing for use in the manufacture of a medicament for improving glycemic control in an individual, wherein a dose of the GGG tri-receptor agonist from about 0.5 mg to about 4.0 mg is administered for at least 1 week, followed by a dose of the GGG tri-receptor agonist from about 2.0 mg to about 8.0 mg for at least 1 week, followed by a dose of the GGG tri-receptor agonist from about 8.0 mg to about 12.0 mg for at least 1 week.

In another aspect, provided herein are methods of chronic weight management, where such methods include administering to the individual a first dose of a GGG tri-receptor agonist (i.e., incretin analog) comprising SEQ ID NO:1 once weekly for about 1 week to about 4 weeks, where the first dose is from about 0.5 mg to about 4.0 mg. In some instances, the first dose is administered once weekly for at least about 1 week, once weekly for at least about 2 weeks or once weekly for at least about 4 weeks. In some instances, the first dose is administered once weekly for about 1 week, once weekly for about 2 weeks, once weekly for about 3 weeks, or once weekly for about 4 weeks. In some instances, the first once weekly dose is 1.0 mg, 2.0 mg, 3.0 or 4.0 mg. In some instances, the first once weekly dose is 1.0 mg, 2.0 mg or 4.0 mg. In some instances, the first once weekly dose is selected from about 1.0 mg to about 2.0 mg. In some instances, the first once weekly dose is about 1.0 mg or about 2.0 mg. In some instances, the first dose is 1.0 mg. In some instances, the first dose is 2.0 mg.

In some embodiments, the methods also include a step of administering to the individual a second once weekly dose of the GGG tri-receptor agonist for at least 1 week. In some instances, the second dose is administered once weekly for at least about 1 week, once weekly for at least about 2 weeks or once weekly for at least about 4 weeks. In some instances, the second dose is administered once weekly for about 1 week, once weekly for about 2 weeks, once weekly for about 3 weeks, or once weekly for about 4 weeks. In some instances, the second once weekly dose is less than the first once weekly dose. Alternatively, the second once weekly dose is the same as the first once weekly dose. Alternatively, the second once weekly dose is greater than the first once weekly dose. In some instances, the second once weekly dose is from about 2.0 mg to about 8.0 mg. In certain instances, the second once weekly dose is 2.0 mg, 3.0 mg, 4.0 mg, 6.0 mg or 8.0 mg. In some instances, the second once weekly dose is selected from about 2.0 mg to about 4.0 mg. In some instances, the second once weekly dose is 2.0 mg, 3.0 mg or 4.0 mg. In some instances, the second once weekly dose is 4.0 mg.

In some embodiments, the methods also include a step of administering to the individual a third dose of the GGG tri-receptor agonist once weekly for at least 1 week. In some instances, the third dose is administered once weekly for at least about 1 week, once weekly for at least about 2 weeks, once weekly for at least about 4 weeks, once weekly for at least about 6 weeks, or once weekly for at least about 8 weeks or more. In some instances, the third dose is administered once weekly for about 1 week, once weekly for about 2 weeks, once weekly for about 3 weeks, once weekly for about 4 weeks, once weekly for about 6 weeks, once weekly for about 8 weeks or more. In some instances, the third once weekly dose can be less than the second once weekly dose. Alternatively, the third once weekly dose can be the same as the second once weekly dose. Alternatively, the third once weekly dose can be greater than the second once weekly dose. In some instances, the third once weekly dose is from about 4.0 mg to about 12.0 mg. In certain instances, the third once weekly dose is 4.0 mg, 6.0 mg, 8.0 mg, 10.0 mg or 12.0 mg. In some instances, the third once weekly dose is selected from about 4.0 mg to about 8.0 mg. In some instances, the third once weekly dose is 4.0 mg, 6.0 mg or 8.0 mg. In some instances, the third once weekly dose is 6.0 mg or 8.0 mg. In some instances, the third once weekly dose is 6.0 mg. In some instances, the third once weekly dose is 8.0 mg.

In some embodiments, the methods also include a step of administering to the individual a fourth dose of the GGG tri-receptor agonist once weekly for at least 1 week. In some instances, the fourth dose is administered once weekly for at least about 1 week, once weekly for at least about 2 weeks, once weekly for at least about 4 weeks, once weekly for at least about 6 weeks, or once weekly for at least about 8 weeks or more. In some instances, the fourth dose is administered once weekly for about 1 week, once weekly for about 2 weeks, once weekly for about 3 weeks, once weekly for about 4 weeks, once weekly for about 6 weeks, or once weekly for about 8 weeks or more. In some instances, the fourth once weekly dose can be less than the third once weekly dose. Alternatively, the fourth once weekly dose can be the same as the third once weekly dose. Alternatively, the fourth once weekly dose can be greater than the third once weekly dose. In some instances, the fourth once weekly dose is from about 6.0 mg to about 12.0 mg. In certain instances, the fourth once weekly dose is 6.0 mg, 8.0 mg, 9.0 mg, 10.0 mg, 11.0 mg or 12.0 mg. In some instances, the fourth once weekly dose is 6.0 mg, 8.0 mg, 9.0 mg, 10.0 mg or 12.0 mg. In some instances, the fourth once weekly dose is 9.0 mg. In some instances, the fourth dose once weekly is 12.0 mg.

In some embodiments, the methods also include a step of administering to the individual a fifth dose of the GGG tri-receptor agonist once weekly for at least 1 week. In some instances, the fifth dose is administered once weekly for at least about 1 week, once weekly for at least about 2 weeks, once weekly for at least about 4 weeks, once weekly for at least about 6 weeks, or once weekly for at least about 8 weeks or more. In some instances, the fifth dose is administered once weekly for about 1 week, once weekly for about 2 weeks, once weekly for about 3 weeks, once weekly for about 4 weeks, once weekly for about 6 weeks, or once weekly for about 8 weeks or more. In some instances, the fifth once weekly dose can be less than the fourth once weekly dose. Alternatively, the fifth once weekly dose can be the same as the fourth once weekly dose. Alternatively, the fifth once weekly dose can be greater than the fourth once weekly dose. In some instances, the fifth once weekly dose is from about 8.0 mg to about 12.0 mg. In certain instances, the fifth once weekly dose is 8.0 mg, 9.0 mg, 10.0 mg, 11.0 mg or 12.0. In some instances, the fifth once weekly dose is 8.0 mg, 10.0 mg or 12.0 mg. In some instances, the fifth once weekly dose is 12.0 mg.

In some embodiments, the methods also include administering to the individual additional doses, such as a sixth once weekly dose, or a seventh once weekly dose, or more. The additional dose may be less, the same or greater than the previous administered dose.

In some embodiments, each once weekly dose is administered for at least about 2 weeks. In some embodiments, each once weekly dose is administered for at least about 4 weeks. In some embodiments, each once weekly dose is administered for about 2 weeks. In some embodiments, each once weekly dose is administered for about 4 weeks.

For instance, in some embodiments, the methods include administering to the individual a first once weekly dose of about 2.0 mg for at least about 4 weeks, a second once weekly dose of about 4.0 mg for at least about 4 weeks, a third once weekly dose of about 8.0 mg for at least about 4 weeks, and a fourth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 8.0 mg for at least about 4 weeks, a fourth once weekly dose of about 10.0 mg for at least about 4 weeks, and a fifth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 6.0 mg for at least about 4 weeks, a fourth once weekly dose of about 8.0 mg for at least about 4 weeks, a fifth once weekly dose of about 10.0 mg for at least about 4 weeks and a sixth once weekly dose of about 12.0 mg for at least about 4 weeks.

In some embodiments, the methods include administering to the individual a first once weekly dose of about 2.0 mg for at least about 4 weeks, a second once weekly dose of about 4.0 mg for at least about 4 weeks, a third once weekly dose of about 6.0 mg for at least about 4 weeks, a fourth once weekly dose of about 9.0 mg for at least about 4 weeks and a fifth once weekly dose of about 12.0 mg for at least about 4 weeks.

In some embodiments, the methods include administering to the individual a first once weekly dose of about 1.0 mg for at least about 4 weeks, a second once weekly dose of about 3.0 mg for at least about 4 weeks, a third once weekly dose of about 6.0 mg for at least about 4 weeks, a fourth once weekly dose of about 9.0 mg for at least about 4 weeks and a fifth once weekly dose of about 12.0 mg for at least about 4 weeks.

In some embodiments, the methods include administering to the individual a first once weekly dose of about 1.0 mg for at least about 4 weeks, a second once weekly dose of about 2.0 mg for at least about 4 weeks, a third once weekly dose of about 4.0 mg for at least about 4 weeks, a fourth once weekly dose of about 6.0 mg for at least about 4 weeks, a fifth once weekly dose of about 8.0 mg for at least about 4 weeks, a sixth once weekly dose of about 10.0 mg for at least about 4 weeks and a seventh once weekly dose of about 12.0 mg for at least about 4 weeks.

In some instances, the individual initially has a body mass index (BMI) of ≥27 kg/m$^2$ but <30 kg/m$^2$. In some instances, the individual initially has a BMI of ≥30 kg/m$^2$. In some instances, the individual has type 2 diabetes. In some instances, the individual has obesity.

In another aspect, provided herein is a GGG tri-receptor agonist comprising SEQ ID NO: 1 for use in providing chronic weight management in an individual, wherein a first once weekly dose of the GGG tri-receptor agonist is administered for at least 1 week and wherein the first dose is from about 0.5 mg to 4.0 mg.

In another aspect, provided herein is a use of GGG tri-receptor agonist comprising SEQ ID NO:1 in the manufacture of a medicament for providing chronic weight management in an individual, wherein a first once weekly dose of the GGG tri-receptor agonist is administered for at least 1 week and wherein the first dose is from about 0.5 mg to 4.0 mg.

In another aspect, provided herein are methods for providing chronic weight management in an individual, comprising administering to the individual a first once weekly dose of a GGG tri-receptor agonist comprising SEQ ID NO:1, wherein the first once weekly dose is from about 0.5 mg to about 4.0 mg and is administered for at least 1 week, increasing the first once weekly dose by increments of about 1.0 mg to about 4.0 mg to a once weekly dose of ≤12.0 mg, wherein each increased once weekly dose is administered for at least 1 week.

In some embodiments, the first once weekly dose is 1.0 mg, 2.0 mg, 3.0 mg or 4.0 mg. In some embodiments, the first once weekly dose is 1.0 mg or 2.0 mg. In some embodiments, the first once weekly dose is 1.0 mg. In some embodiments, the first once weekly dose is 2.0 mg.

In some embodiments, the first once weekly dose and each increased once weekly dose thereafter is increased in an increment of about 1.0 mg, about 2.0 mg, about 3.0 mg or about 4.0 mg to reach a once weekly dose of ≤12.0 mg. The increments in a dosing schedule may be the same or different. For instance, a dose may be increased by 2.0 mg and the next or subsequent dose may be further increased by the same increment of 2.0 mg, or by a different increment such as 1.0 mg, 3.0 or 4.0 mg.

The first dose and each increased dose are administered once weekly for at least 1 week. In some instances, the first once weekly dose and each increased once weekly dose are administered once weekly for at least 2 weeks, once weekly for at least 3 weeks, or once weekly for at least 4 weeks. In some instances, the first once weekly dose and each increased once weekly dose are administered once weekly for at least 4 weeks. In some instances, the first once weekly dose and each increased once weekly dose are administered once weekly for about 2 weeks, once weekly for about 3 weeks, or once weekly for about 4 weeks. In some instances, the first once weekly dose and each increased once weekly dose are administered once weekly for about 4 weeks. In some instances, the first once weekly dose and subsequent increased once weekly doses are administered once weekly for about 4 weeks until a once weekly dose ≤12.0 mg is reached.

In some embodiments, the first once weekly dose is 1.0 mg, and the increased once weekly doses are selected from 2.0, 3.0, 4.0, 5.0, 6.0, 7.0, 8.0, 9.0, 10.0, 11.0 or 12.0 mg. In some embodiments, the first once weekly dose is 2.0 mg, and the increased once weekly doses are selected from 3.0, 4.0, 5.0, 6.0, 7.0, 8.0, 9.0, 10.0, 11.0 or 12.0 mg.

In some embodiments, the first once weekly dose is 2.0 mg, and the increased weekly doses are 4.0, 8.0 and 12.0 mg. In some embodiments, the first once weekly dose is 2.0 mg, and the increased weekly doses are 4.0, 8.0, 10.0 and 12.0 mg. In some embodiments, the first once weekly dose is 2.0 mg, and the increased weekly doses are 4.0, 6.0, 8.0, 10.0 and 12.0 mg. In some embodiments, the first once weekly dose is 2.0 mg, and the increased weekly doses are 4.0, 6.0, 9.0 and 12.0 mg. In some embodiments, the first once weekly dose is 1.0 mg, and the increased weekly doses are 3.0, 6.0, 9.0 and 12.0 mg. In some embodiments, the first once weekly dose is 1.0 mg, and the increased weekly doses are 2.0, 4.0, 6.0, 8.0, 10.0 and 12.0 mg.

Starting doses, increments and/or the number of steps to reach a maximum dose of ≤12.0 may be adjusted in view of efficacy, safety and tolerability for the individual.

In some instances, the individual initially has a body mass index (BMI) of ≥27 kg/m$^2$ but <30 kg/m$^2$. In some instances, the individual initially has a BMI of ≥30 kg/m$^2$. In some instances, the individual has type 2 diabetes. In some instances, the individual has obesity.

In another aspect, provided herein is a GGG tri-receptor agonist comprising SEQ ID NO: 1 for use in providing chronic weight management in an individual, wherein a first once weekly dose of the GGG tri-receptor agonist is from about 0.5 mg to about 4.0 mg and is administered for at least 1 week, and wherein the first once weekly dose is increased by increments of about 1.0 to about 4.0 mg to a once weekly dose of ≤12.0 mg, and wherein each increased once weekly dose is administered for at least 1 week.

In another aspect, provided herein is a use of a GGG tri-receptor agonist comprising SEQ ID NO: 1 in the manufacture of a medicament for providing chronic weight management in an individual, wherein a first once weekly dose of the GGG tri-receptor agonist is from about 0.5 mg to about 4.0 mg and is administered for at least 1 week, and wherein the first once weekly dose is increased by increments of about 1.0 to about 4.0 mg to a once weekly dose of ≤12.0 mg, and wherein each increased once weekly dose is administered for at least 1 week.

In another aspect, provided herein are methods for chronic weight management, where such methods include the steps of (a) administering to the individual from about 0.5 mg to about 4.0 mg of a GGG tri-receptor agonist having a structure of SEQ ID NO:1 suitable for once-weekly dosing for at least 1 week, (b) administering to the individual from about 2.0 mg to about 8.0 mg of the GGG tri-receptor agonist once weekly for at least 1 week, and (c) administering to the individual from about 8.0 mg to about 12.0 mg of the GGG tri-receptor agonist once weekly for at least 1 week.

In another aspect, provided herein is a GGG tri-receptor agonist comprising SEQ ID NO: 1 for use in providing chronic weight management in an individual, wherein a dose of the GGG tri-receptor agonist from about 0.5 mg to about 4.0 mg is administered for at least 1 week, followed by a dose of the GGG tri-receptor agonist from about 2.0 mg to about 8.0 mg for at least 1 week, followed by a dose of the GGG tri-receptor agonist from about 8.0 mg to about 12.0 mg for at least 1 week.

In another aspect, provided herein is a use of a GGG tri-receptor agonist comprising SEQ ID NO: 1 in the manufacture of a medicament for providing chronic weight management in an individual, wherein a dose of the GGG tri-receptor agonist from about 0.5 mg to about 4.0 mg is administered for at least 1 week, followed by a dose of the GGG tri-receptor agonist from about 2.0 mg to about 8.0 mg for at least 1 week, followed by a dose of the GGG tri-receptor agonist from about 8.0 mg to about 12.0 mg for at least 1 week.

In another aspect, provided herein are methods of treating diabetes mellitus (especially T2DM), dyslipidemia, metabolic syndrome, NAFLD, NASH, obesity, obstructive sleep apnea, osteoarthritis, polycystic ovary syndrome and/or chronic kidney disease, where such methods include administering to the individual a first dose of a GGG tri-receptor agonist (i.e., incretin analog) having a structure of SEQ ID NO: 1 once weekly for about 1 week to about 4 weeks, where the first dose is from about 0.5 mg to about 4.0 mg.

In another aspect provided herein are methods of treating diabetes mellitus (especially T2DM), dyslipidemia, metabolic syndrome, NAFLD, NASH, obesity, obstructive sleep apnea, osteoarthritis, polycystic ovary syndrome and/or chronic kidney disease, where such methods include administering to the individual a first once weekly dose of a GGG tri-receptor agonist comprising SEQ ID NO:1, wherein the first once weekly dose is from about 0.5 mg to about 4.0 mg and is administered for at least 1 week, increasing the first once weekly dose by increments of about 1.0 mg to about 4.0 mg to a once weekly dose of ≤12.0 mg, wherein each increased once weekly dose is administered for at least 1 week.

In another aspect provided herein are methods of treating diabetes mellitus (especially T2DM), dyslipidemia, metabolic syndrome, NAFLD, NASH, obesity, obstructive sleep apnea, osteoarthritis, polycystic ovary syndrome and/or chronic kidney disease, where such methods include the steps of (a) administering to the individual from about 0.5 mg to about 4.0 mg of a GGG tri-receptor agonist having a structure of SEQ ID NO: 1 suitable for once-weekly dosing for at least 1 week, (b) administering to the individual from about 2.0 mg to about 8.0 mg of the GGG tri-receptor agonist once weekly for at least 1 week, and (c) administering to the individual from about 8.0 mg to about 12.0 mg of the GGG tri-receptor agonist once weekly for at least 1 week.

In another aspect, methods are provided for improving glycemic control in an individual having diabetes, especially T2DM, where such methods include a step (a) of administering to the individual a first dose of a GGG tri-receptor agonist (i.e., incretin analog) having a structure of SEQ ID NO: 1 once weekly for about 1 week to about 4 weeks, where the first dose is from about 0.5 mg to about 4.0 mg. In some instances, the first dose is administered once weekly for 1 week, once weekly for 2 weeks, once weekly for 3 weeks, or once weekly for 4 weeks. In some instances, the first dose is 1.0 mg, 2.0 mg or 4.0 mg.

The methods also include a step (b) of measuring at least one of the individual's FG and HbA1c during step (a). Methods of measuring FG and HbA1c are well known to one of skill in the art and need not be exhaustively described.

The methods also include a step (c) of recording the individual's frequency and severity of hypoglycemia and optionally other AEs during step (a). In some instances, the AEs can be diarrhea, emesis, GI discomfort and nausea.

The methods also include a step (d) of determining a second dose of the GGG tri-receptor agonist from the individual's FG, HbA1c or both of step (b) and/or from the individual's frequency and severity of hypoglycemia and optionally other AEs of step (c).

The methods also include a step (e) of administering to the individual the second dose of the GGG tri-receptor agonist once weekly for at least 1 week, where the second dose is from about 2.0 mg to about 8.0 mg. In some instances, the second dose is administered once weekly for 1 week, once weekly for 2 weeks, once weekly for 3 weeks, or once weekly for 4 weeks. In some instances, the second dose is less than the first dose. Alternatively, the second dose is the same as the first dose. Alternatively, the second dose is greater than the first dose. In certain instances, the second dose is 4.0 mg, 6.0 mg or 8.0 mg.

The methods also can include a step (f) of measuring at least one of the individual's FG and HbA1c at least once during step (e).

The methods also include a step (g) of recording the individual's frequency and severity of hypoglycemia and optionally other AEs during step (e).

The methods also include a step (h) of determining a third dose of the GGG tri-receptor agonist from the individual's FG, HbA1c or both of step (f) and/or from the individual's frequency and severity of hypoglycemia and optionally other AEs during step (g).

The methods also include a step (i) of administering to the individual the third dose of the GGG tri-receptor agonist once weekly for at least 1 week, where the third dose is from about 8.0 mg to about 12.0 mg. In some instances, the third dose is administered once weekly for 1 week, once weekly for 2 weeks, once weekly for 3 weeks, once weekly for 4 weeks, once weekly for 6 weeks, or once weekly for 8 weeks or more. In some instances, the third dose can be less than the second dose. Alternatively, the third dose can be the same as the second dose. Alternatively, the third dose can be greater than the second dose. In certain instances, the third dose is 8.0 mg, 10.0 mg or 12.0 mg.

In another aspect, methods are provided for improving glycemic control in an individual having diabetes, especially T2DM, where such methods include a step (a) of administering to the individual from about 0.5 mg to about 4.0 mg of a GGG tri-receptor agonist having a structure of SEQ ID NO: 1 suitable for once-weekly dosing for at least 1 week. In some instances, the GGG tri-receptor agonist is administered once weekly for 1 week, once weekly for 2 weeks, or once weekly for 4 weeks. In some instances, the dose is 2.0 mg or 4.0 mg. The methods also include a step (b) of administering to the individual from about 2.0 mg to about 8.0 mg of the GGG tri-receptor agonist once weekly for at least 1 week. In some instances, the GGG tri-receptor agonist is administered once weekly for 1 week, once weekly for 2 weeks, once weekly for 3 weeks, once weekly for 4 weeks, once weekly for 6 weeks, or once weekly for 8 weeks or more. In some instances, the dose is 4.0 mg, 6.0 mg or 8.0 mg. The methods also include a step (c) of administering to the individual from about 8.0 mg to about 12.0 mg of the GGG tri-receptor agonist once weekly for at least 1 week. In some instances, the dose is 8.0 mg, 10.0 mg or 12.0 mg.

In another aspect, methods are provided for improving glycemic control in an individual having diabetes, especially T2DM, where such methods include a step (a) of administering to the individual a loading dose of a GGG tri-receptor agonist having a structure of SEQ ID NO:1 suitable for once-weekly dosing. In some instances, the GGG tri-receptor agonist is administered once weekly for 1 week, once weekly for 2 weeks, or once weekly for 4 weeks. In some instances, the loading dose can be determined by multiplying the individual's expected weekly maintenance dose by about 1.5, 1.6, 1.7, 1.8, 1.9, 2.0, 2.1, 2.2, 2.3, 2.4, 2.5, 2.6, 2.7, 2.8, 2.9 or 3.0. In other instances, the loading dose can be the same as the maintenance dose. In certain instances, the loading dose can be from about 6.0 mg to about 12.0 mg. Alternatively, the loading dose is ≤12.0 mg.

The methods also include a step (b) of administering to the individual a maintenance dose of the GGG tri-receptor agonist suitable for once-weekly dosing. In some instances, the GGG tri-receptor agonist is administered once weekly for 1 week, once weekly for 2 weeks, once weekly for 3 weeks, once weekly for 4 weeks, once weekly for 6 weeks, or once weekly for 8 weeks or more. In some instances, the maintenance dose can be from about 2.0 mg to about 6.0 mg.

In another aspect, methods are provided for weight management, where such methods include a step (a) of administering to the individual a first dose of a GGG tri-receptor agonist (i.e., incretin analog) having a structure of SEQ ID NO:1 once weekly for about 1 week to about 4 weeks, where the first dose is from about 0.5 mg to about 4.0 mg. In some instances, the first dose is administered once weekly for 1 week, once weekly for 2 weeks, once weekly for 3 weeks, or once weekly for 4 weeks. In some instances, the first dose is 1.0 mg, 2.0 mg or 4.0 mg.

The methods also include a step (b) of measuring at least one of the individual's BW during step (a).

The methods also include a step (c) of recording the frequency and severity of the individual's AEs during step (a). In some instances, the AEs are diarrhea, emesis, GI discomfort, hypoglycemia and nausea.

The methods also include a step (d) of determining a second dose of the GGG tri-receptor agonist from the individual's BW of step (b) and/or from the individual's frequency and severity of AEs of step (c).

The methods also include a step (e) of administering to the individual the second dose of the GGG tri-receptor agonist once weekly for at least 1 week, where the second dose is from about 2.0 mg to about 8.0 mg. In some instances, the second dose is administered once weekly for 1 week, once weekly for 2 weeks, once weekly for 3 weeks, or once weekly for 4 weeks. In some instances, the second dose is less than the first dose. Alternatively, the second dose is the same as the first dose. Alternatively, the second dose is greater than the first dose. In certain instances, the second dose is 4.0 mg, 6.0 mg or 8.0 mg.

The methods also can include a step (f) of measuring the individual's BW at least once during step (e).

The methods also include a step (g) of recording the individual's frequency and severity of AEs during step (e).

The methods also include a step (h) of determining a third dose of the GGG tri-receptor agonist from the individual's BW of step (f) and/or from the individual's frequency and severity of AEs during step (g).

The methods also include a step (i) of administering to the individual the third dose of the GGG tri-receptor agonist once weekly for at least 1 week, where the third dose is from about 8.0 mg to about 12.0 mg. In some instances, the third dose is administered once weekly for 1 week, once weekly for 2 weeks, once weekly for 3 weeks, once weekly for 4 weeks, once weekly for 6 weeks, or once weekly for 8 weeks or more. In some instances, the third dose can be less than the second dose. Alternatively, the third dose can be the same as the second dose. Alternatively, the third dose can be greater than the second dose. In certain instances, the third dose is 8.0 mg, 10.0 mg or 12.0 mg.

In some instances, at step (a) the individual initially has a BMI of ≥27 kg/m² but <30 kg/m² and thus is overweight. In other instances, at step (a) the individual initially has a BMI≥30 kg/m² and thus is obese.

In another aspect, methods are provided for weight management, where such methods include a step (a) of administering to the individual from about 0.5 mg to about 4.0 mg of a GGG tri-receptor agonist having a structure of SEQ ID NO: 1 suitable for once-weekly dosing for at least 1 week. In some instances, the GGG tri-receptor agonist is administered once weekly for 1 week, once weekly for 2 weeks, or once weekly for 4 weeks. In some instances, the dose is 2.0 mg or 4.0 mg.

The methods also include a step (b) of administering to the individual from about 2.0 mg to about 8.0 mg of the GGG tri-receptor agonist once weekly for at least 1 week. In some instances, the GGG tri-receptor agonist is administered once weekly for 1 week, once weekly for 2 weeks, once weekly for 3 weeks, once weekly for 4 weeks, once weekly for 6 weeks, or once weekly for 8 weeks or more. In some instances, the dose is 4.0 mg, 6.0 mg or 8.0 mg.

The methods also include a step (c) of administering to the individual from about 8.0 mg to about 12.0 mg of the GGG tri-receptor agonist once weekly for at least 1 week. In some instances, the dose is 8.0 mg, 10.0 mg or 12.0 mg.

In some instances, at step (a) the individual initially has a BMI of ≥27 kg/m² but <30 kg/m² and thus is overweight. In other instances, at step (a) the individual initially has a BMI≥30 kg/m² and thus is obese.

In another aspect, methods are provided for weight management, where such methods include a step (a) of administering to the individual a loading dose of a GGG tri-receptor agonist having a structure of SEQ ID NO:1 suitable for once-weekly dosing. In some instances, the GGG tri-receptor agonist is administered once weekly for 1 week, once weekly for 2 weeks, or once weekly for 4 weeks. In some instances, the loading dose can be determined by multiplying the individual's expected weekly maintenance dose by about 1.5, 1.6, 1.7, 1.8, 1.9, 2.0, 2.1, 2.2, 2.3, 2.4, 2.5, 2.6, 2.7, 2.8, 2.9 or 3.0. In other instances, the loading dose can be the same as the maintenance dose. In certain instances, the loading dose can be from about 6.0 mg to about 12.0 mg. Alternatively, the loading dose is ≤12.0 mg.

The methods also include a step (b) of administering to the individual a maintenance dose of the GGG tri-receptor agonist suitable for once-weekly dosing. In some instances, the GGG tri-receptor agonist is administered once weekly for 1 week, once weekly for 2 weeks, once weekly for 3 weeks, once weekly for 4 weeks, once weekly for 6 weeks, or once weekly for 8 weeks or more. In some instances, the maintenance dose can be from about 2.0 mg to about 6.0 mg.

In some instances, at step (a) the individual initially has a BMI of ≥27 kg/m² but <30 kg/m² and thus is overweight. In other instances, at step (a) the individual initially has a BMI≥30 kg/m² and thus is obese.

In another aspect, provided herein is a GGG tri-receptor agonist comprising SEQ ID NO: 1 for use in improving glycemic control or providing chronic weight management in an individual having type 2 diabetes (T2DM) and in need of additional glycemic control, wherein a first once weekly dose of the GGG tri-receptor agonist is administered for a minimum time period from about 1 week to about 4 weeks at least 1 week and wherein the first dose is from about 0.5 mg to 4.0 mg, wherein during the administration of the first once weekly dose the individual's fasting glucose (FG) and/or hemoglobin A1c (HbA1c) is measured at least once and the individual's frequency and severity of hypoglycemia and optionally other adverse events are recorded, and a second dose is determined from the individual's FG, HbA1c or both and/or from the individual's frequency and severity of hypoglycemia, and the second dose of the GGG tri-receptor agonist is administered for at least 1 week.

In another aspect, provided herein is use of a GGG tri-receptor agonist comprising SEQ ID NO:1 in the manufacture of a medicament for improving glycemic control or providing chronic weight management in an individual having type 2 diabetes (T2DM) and in need of additional glycemic control, wherein a first once weekly dose of the GGG tri-receptor agonist is administered for a minimum time period from about 1 week to about 4 weeks at least 1 week and wherein the first dose is from about 0.5 mg to 4.0 mg, wherein during the administration of the first once weekly dose the individual's fasting glucose (FG) and/or hemoglobin A1c (HbA1c) is measured at least once and the individual's frequency and severity of hypoglycemia and optionally other adverse events are recorded, and a second dose is determined from the individual's FG, HbA1c or both and/or from the individual's frequency and severity of hypoglycemia, and the second dose of the GGG tri-receptor agonist is administered for at least 1 week.

In another aspect, provided herein is a GGG tri-receptor agonist comprising SEQ ID NO: 1 suitable for once-weekly dosing for use in improving glycemic control or providing chronic weight management in an individual having type 2 diabetes (T2DM) and in need of additional glycemic control, wherein a dose of the GGG tri-receptor agonist selected from about 0.5 mg to 4.0 mg is administered for at least 1 week, followed by a dose of the GGG tri-receptor agonist selected from about 2.0 mg to 8.0 mg for at least 1 week, followed by a dose of the GGG tri-receptor agonist selected from about 8.0 mg to 12.0 mg for at least 1 week.

In another aspect, provided herein is use of a GGG tri-receptor agonist comprising SEQ ID NO:1 suitable for once-weekly dosing in the manufacture of a medicament for improving glycemic control or providing chronic weight management in an individual having type 2 diabetes (T2DM) and in need of additional glycemic control, wherein a dose of the GGG tri-receptor agonist selected from about 0.5 mg to 4.0 mg is administered for at least 1 week, followed by a dose of the GGG tri-receptor agonist selected from about 2.0 mg to 8.0 mg for at least 1 week, followed by a dose of the GGG tri-receptor agonist selected from about 8.0 mg to 12.0 mg for at least 1 week.

In another aspect, provided herein is a GGG tri-receptor agonist comprising SEQ ID NO: 1 suitable for once-weekly dosing for use in improving glycemic control or providing chronic weight management in an individual having type 2 diabetes (T2DM) and in need of additional glycemic control, wherein a loading dose of the GGG tri-receptor agonist is administered, followed by a maintenance dose of the GGG tri-receptor agonist.

In another aspect, provided herein is use of a GGG tri-receptor agonist comprising SEQ ID NO:1 suitable for once-weekly dosing in the manufacture of a medicament for improving glycemic control or providing chronic weight management in an individual having type 2 diabetes (T2DM) and in need of additional glycemic control, wherein a loading dose of the GGG tri-receptor agonist is administered, followed by a maintenance dose of the GGG tri-receptor agonist.

EXAMPLES

The following non-limiting examples are offered for purposes of illustration, not limitation.
Single Ascending Dose (SAD) and Multiple Ascending Dose (MAD) Studies

Example 1: SAD Study

Studies are designed to evaluate the safety, tolerability, pharmacodynamics (PD) and pharmacokinetics (PK) of the GGG tri-receptor agonist (SEQ ID NO:1) in healthy individuals. The SAD study is a randomized, investigator- and participant-blind, placebo-controlled, single-dose, single-site, dose-escalation study conducted in healthy individuals (e.g., overtly healthy females or males aged 21-65 years, inclusive, with a BMI 19-40 kg/m² at screening).

Six dose levels of the GGG tri-receptor agonist-0.1, 0.3, 1.0, 3.0, 4.5 and 6.0 mg—are explored in the SAD study, as well as placebo (i.e., 0.0 mg). A dose escalation of the GGG tri-receptor agonist is assessed in cohorts of healthy individuals (e.g., 6 individuals receiving the GGG tri-receptor agonist and 2 individuals receiving placebo per cohort). Staggered dosing is performed for each cohort, in which a new higher dose of the GGG tri-receptor agonist is administered. All injections are administered into the SC tissue of an abdominal wall, in a right or left lower quadrant.

Blood samples are collected pre-dose and at 4 hours (hr), 10 hr, 14 hr, 24 hr (Day 1), 48 hr (Day 2), 72 hr (Day 3), 96 hr (Day 4), 120 hr (Day 6), 168 hr (Day 7), 336 hr (Day 14), 672 hr (Day 28) and 1008 hr (Day 42) post-dose to determine plasma concentration of the GGG tri-receptor agonist. Plasma concentrations are used to compute PK parameters using standard non-compartmental methods in a validated software program (Phoenix WinNonlin Version 8.1).

Insulin and C-peptide are measured at pre-dose and at 24 hr, 48 hr, 168 hr, 336 hr, 672 hr and 1008 hr post-dose.

Satiety VAS (visual analogue score) is measured at pre-dose and at 24 hr, 48 hr, 168 hr, 672 hr and 672 hr post-dose.

BW is measured at pre-dose and at 168 hr, 336 hr, 672 hr and 1008 hr post-dose.

Bioanalytical methods: plasma samples are analyzed at Q2 Solutions (Ithaca, NY). The samples are analyzed for the GGG tri-receptor agonist using a validated liquid chromatography high resolution mass spectrometry method. The lower limit of quantification is 1.00 ng/mL and the upper limit of quantification is 500.00 ng/ml. Samples above a limit of quantification are diluted and reanalyzed to yield results within the calibrated range. The intra-assay accuracy (% relative error) during validation ranges from −6.3% to 15.7%. The intra-assay precision (% relative standard deviation) during validation is ≤14.7%. The GGG tri-receptor agonist is stable for up to 96 days when stored at about-20° C. and about −70° C.

PD analyses: absolute values and change from baseline are calculated from concentrations of the following PD markers: FG, insulin, C-peptide, GCG, lipids (e.g., triglycerides, cholesterol, low-density lipoprotein (LDL) cholesterol, and high-density lipoprotein (HDL) cholesterol), free fatty acids and β-hydroxybutyrate.

Appetite sensations are assessed using a VAS for parameters of hunger, fullness, satiety and prospective food intake. An overall appetite score is calculated as the average of 4 individual scores as per the below equation (see, e.g., van Can et al. (2014) *Int. J. Obes. (Lond).* 38:784-793):

$$\frac{\text{satiety} + \text{fullness} + (100 - \text{prospective food consumption}) + (100 - \text{hunger})}{4}.$$

A higher overall appetite score is indicative of a lower appetite.

As per the protocol, body weight is measured as a safety assessment; however, body weight also provides insight as a PD marker.

Safety analyses: Safety parameters assessed during the study included: AEs (with special interest to GI AEs such as nausea, vomiting, and diarrhea), laboratory parameters (with special attention to hepatic and pancreatic biomarkers), physical examinations/medical assessments, vital signs and ECGs, BW, injection site reactions, hypersensitivity reactions, and glucose monitoring (with special attention to hypoglycemia).

PK analyses: plasma concentrations of the GGG tri-receptor agonist are measured at pre-dose and at 4 hr, 10 hr, 14 hr, 24 hr, 48 hr, 72 hr, 96 hr, 120 hr, 168 hr, 336 hr, 672 hr and 1008 hr post-dose and are used to determine the following PK parameters using standard non-compartmental methods in a validated software program (Phoenix WinNonlin Version 8.1): AUC (0-∞), AUC (0-$t_{last}$), % AUC ($t_{last}$-∞), $C_{max}$, $t_{max}$, t½, CL/F, Vz/F and Vss/F.

Actual sampling times are used in the calculation of all PK parameters and concentration versus time profiles.

Concentration values below the quantifiable lower limit of the assay are excluded from the calculation of PK parameters, except for those prior to the first measurable concentration, which are set to a value of 0.

A concentration average is plotted for a given sample if two thirds of the individual data at the time point have quantifiable measurements. Concentrations at sampling times exceeding ±10% of the scheduled time ware excluded from the average concentration profiles.

PD results: The SAD study indicates that single, SC doses of 0.1, 0.3, 1.0 and 3.0 mg of the GGG tri-receptor agonist are well tolerated. Higher doses of 4.5 and 6.0 mg of the GGG tri-receptor agonist is associated with increased incidence of GI events, including vomiting, abdominal distension and nausea. AEs are dose-dependent and are mild to moderate in severity. Treatment-emergent AEs (TEAEs) are reported by 97.1% of the individuals, and of these, 20 (57.1%) report TEAEs that are related to study treatment. Hypoglycemic episodes are low across all groups. In fact, all events are asymptomatic and promptly recover. No injection-site reactions are reported. Dose-related increases in pulse rate are observed following a single, SC dose of the GGG tri-receptor agonist, but returned to baseline or near-baseline by Day 29. Dose-related stimulation of insulin secretion and reduction of GCG also are observed.

TABLE 1

Least Squared Mean Change from Baseline in Fasting Glucose Following Single Dose of GGG Tri-Receptor Agonist.

| Dose (mg) | Pre-Dose | Day 1 | Day2 | Day 7 | Day 14 | Day 28 | Day 42 |
|---|---|---|---|---|---|---|---|
| Placebo | 5.41 | −0.06 | −0.07 | −0.10 | −0.10 | 0.22 | 0.20 |
| 0.1 | 5.37 | 0.11 | −0.11 | ND | 0.01 | −0.13 | 0.19 |
| 0.3 | 5.30 | −0.13 | −0.21 | ND | −0.08 | ND | 0.05 |
| 1.0 | 5.38 | 0.00 | −0.19 | ND | −0.19 | 0.26 | 0.01 |
| 3.0 | ND | ND | ND | ND | ND | ND | ND |
| 4.5 | 5.37 | −0.01 | 0.11 | −0.11 | −0.11 | −0.38* | −0.01 |
| 6.0 | 5.30 | −0.15 | 0.15 | −0.39 | −0.29 | 0.03 | 0.09 |

NOTE:
ND = not done;
*the difference in least squares mean change from baseline for GGG tri-receptor agonist compared to placebo is statistically significant (90% CI does not span unity).

TABLE 2

Least Squared Mean Change from Baseline in Fasting Insulin Following Single Dose of GGG Tri-Receptor Agonist.

| Dose (mg) | Pre-Dose | Day 2 | Day 3 | Day 7 | Day 14 | Day 28 | Day 42 |
|---|---|---|---|---|---|---|---|
| Placebo | 41.30 | 8.20 | 15.00 | 2.50 | −0.50 | 6.00 | −1.50 |
| 0.1 | 36.33 | 31.01 | 47.01 | 25.35* | 25.01* | 17.01 | 17.01* |
| 0.3 | 29.00 | 19.36 | 27.86 | 14.20 | 2.20 | 3.20 | −0.30 |
| 1.0 | 60.33 | 57.96 | 88.62* | −5.04 | −1.38 | 20.62 | 7.12 |
| 3.0 | 44.50 | 73.94* | 81.45* | −5.87 | −5.67 | 14.99 | 1.16 |
| 4.5 | 25.17 | 48.54 | 28.37 | 16.04 | 3.04 | −3.63 | 6.37 |
| 6.0 | 55.00 | 116.57* | 48.57 | −7.43 | −16.03* | 0.37 | −1.83 |

NOTE:
ND = not done;
*the difference in least squares mean change from baseline for GGG tri-receptor agonist compared to placebo is statistically significant (90% CI does not span unity).

TABLE 3

Least Squared Mean Change from Baseline in Fasting C-Peptide Following Single Dose of GGG Tri-Receptor Agonist.

| Dose (mg) | Pre-Dose | Day 2 | Day 3 | Day 7 | Day 14 | Day 28 | Day 42 |
|---|---|---|---|---|---|---|---|
| Placebo | 8.20 | 15.00 | 2.50 | −0.50 | 6.00 | −1.50 | 8.20 |
| 0.1 | 31.01 | 47.01 | 25.35* | 25.01* | 17.01 | 17.01* | 31.01 |
| 0.3 | 19.36 | 27.86 | 14.20 | 2.20 | 3.20 | −0.30 | 19.36 |
| 1.0 | 57.96 | 88.62* | −5.04 | −1.38 | 20.62 | 7.12 | 57.96 |

TABLE 3-continued

Least Squared Mean Change from Baseline in Fasting C-Peptide
Following Single Dose of GGG Tri-Receptor Agonist.

| Dose (mg) | Study Day and C-Peptide (pmol/L) | | | | | | |
| --- | --- | --- | --- | --- | --- | --- | --- |
| | Pre-Dose | Day 2 | Day 3 | Day 7 | Day 14 | Day 28 | Day 42 |
| 3.0 | 73.94* | 81.45* | −5.87 | −5.67 | 14.99 | 1.16 | 73.94* |
| 4.5 | 48.54 | 28.37 | 16.04 | 3.04 | −3.63 | 6.37 | 48.54 |
| 6.0 | 116.57* | 48.57 | −7.43 | −16.03* | 0.37 | −1.83 | 116.57* |

NOTE
ND = not done;
*the difference in least squares mean change from baseline for GGG tri-receptor agonist compared to placebo is statistically significant (90% CI does not span unity).

TABLE 4

Least Squared Mean Change from Baseline in Triglycerides
Following Single Dose of GGG Tri-Receptor Agonist.

| Dose (mg) | Study Day and Triglycerides (mmol/L) | | | | | | |
| --- | --- | --- | --- | --- | --- | --- | --- |
| | Pre-Dose | Day 2 | Day 3 | Day 7 | Day 14 | Day 28 | Day 42 |
| Placebo | 1.36 | 0.40 | 0.20 | −0.07 | 0.09 | −0.18 | 0.06 |
| 0.1 | 1.79 | 0.51 | 0.99* | ND | −0.04 | 0.39* | −0.05 |
| 0.3 | 1.05 | 0.41 | 0.42 | ND | −0.04 | ND | 0.18 |
| 1.0 | 1.74 | 0.69 | 0.84* | ND | −0.38 | −0.16 | −0.42 |
| 3.0 | 1.52 | 0.90* | 0.82* | −0.42* | −0.03 | 0.42* | 0.50 |
| 4.5 | 1.12 | 0.47 | 0.82* | −0.15 | −0.19 | 0.05 | 0.22 |
| 6.0 | 1.62 | 0.06 | 0.18 | −0.51* | −0.14 | 0.01 | 0.16 |

NOTE:
ND = not done;
*the difference in least squares mean change from baseline for GGG tri-receptor agonist compared to placebo is statistically significant (90% CI does not span unity).

TABLE 5

Least Squares Mean Change from Baseline in Cholesterol
Following Single Dose of GGG Tri-Receptor Agonist.

| Dose (mg) | Study Day and Cholesterol (mmol/L) | | | | | | |
| --- | --- | --- | --- | --- | --- | --- | --- |
| | Pre-Dose | Day 2 | Day 3 | Day 7 | Day 14 | Day 28 | Day 42 |
| Placebo | 4.67 | 0.07 | 0.00 | 0.03 | 0.13 | 0.00 | 0.19 |
| 0.1 | 4.76 | −0.01 | −0.13 | 0.12 | 0.16 | 0.23 | −0.12 |
| 0.3 | 4.73 | 0.17 | 0.12 | 0.10 | −0.02 | 0.41* | −0.02 |
| 1.0 | 5.03 | 0.28 | 0.04 | −0.10 | −0.18 | 0.33 | 0.06 |
| 3.0 | 5.09 | 0.22 | −0.11 | 0.11 | −0.49* | −0.11 | 0.00 |
| 4.5 | 4.24 | 0.49* | 0.22 | −0.28 | −0.41* | 0.08 | 0.15 |
| 6.0 | 5.00 | 0.41* | 0.31 | −0.27 | −0.33 | −0.28 | −0.25* |

NOTE:
ND = not done;
*the difference in least squares mean change from baseline for GGG tri-receptor agonist compared to placebo is statistically significant (90% CI does not span unity).

TABLE 6

Least Squares Mean Change from Baseline in LDL Cholesterol
Following Single Dose of GGG Tri-Receptor Agonist.

| Dose (mg) | Study Day and LDL-Cholesterol (mmol/L) | | | | | | |
| --- | --- | --- | --- | --- | --- | --- | --- |
| | Pre-Dose | Day 2 | Day 3 | Day 7 | Day 14 | Day 28 | Day 42 |
| Placebo | 3.11 | 0.01 | −0.03 | 0.04 | 0.12 | 0.16 | 0.23 |
| 0.1 | 3.22 | 0.01 | −0.56* | −0.03 | 0.20 | 0.05 | −0.11 |
| 0.3 | 3.30 | 0.09 | −0.24 | −0.04 | −0.10 | 0.36 | 0.00 |

TABLE 6-continued

Least Squares Mean Change from Baseline in LDL Cholesterol
Following Single Dose of GGG Tri-Receptor Agonist.

| | Study Day and LDL-Cholesterol (mmol/L) | | | | | | |
|---|---|---|---|---|---|---|---|
| Dose (mg) | Pre-Dose | Day 2 | Day 3 | Day 7 | Day 14 | Day 28 | Day 42 |
| 1.0 | 3.33 | 0.08 | −0.01 | 0.19 | 0.14 | 0.49 | 0.51 |
| 3.0 | 3.53 | −0.13 | −0.38 | 0.19 | −0.29* | 0.09 | −0.09 |
| 4.5 | 2.92 | 0.21 | 0.04 | −0.08 | −0.28 | 0.03 | 0.03 |
| 6.0 | 3.37 | 0.46* | 0.40* | 0.04 | −0.04 | 0.07 | −0.12 |

NOTE:
ND = not done;
*the difference in least squares mean change from baseline for GGG tri-receptor agonist compared to placebo is statistically significant (90% CI does not span unity).

TABLE 7

Least Squares Mean Change from Baseline in HDL Cholesterol
Following Single Dose of GGG Tri-Receptor Agonist.

| | Study Day and HDL-Cholesterol (mmol/L) | | | | | | |
|---|---|---|---|---|---|---|---|
| Dose (mg) | Pre-Dose | Day 2 | Day 3 | Day 7 | Day 14 | Day 28 | Day 42 |
| Placebo | 1.32 | −0.03 | 0.01 | 0.02 | 0.06 | 0.01 | 0.03 |
| 0.1 | 1.08 | −0.05 | −0.09 | −0.06 | 0.06 | 0.05 | 0.03 |
| 0.3 | 1.40 | 0.01 | −0.01 | −0.08 | −0.05 | −0.07 | −0.01 |
| 1.0 | 1.27 | −0.04 | −0.05 | −0.14* | −0.05 | 0.16* | 0.13 |
| 3.0 | 1.25 | −0.08 | −0.06 | 0.02 | −0.10* | −0.04 | −0.03 |
| 4.5 | 1.20 | 0.00 | −0.06 | −0.22* | −0.22* | −0.08 | −0.02 |
| 6.0 | 1.30 | 0.07* | −0.02 | −0.15* | −0.12* | −0.11 | −0.08 |

NOTE:
ND = not done;
*the difference in least squares mean change from baseline for GGG tri-receptor agonist compared to placebo is statistically significant (90% CI does not span unity).

TABLE 8

Mean β-Hydroxybutyrate Following Single Dose of GGG Tri-Receptor Agonist.

| | Study Day and β-Hydroxybutyrate (μmol/L) | | | | | | |
|---|---|---|---|---|---|---|---|
| Dose (mg) | Pre-Dose | Day 2 | Day 3 | Day 7 | Day 14 | Day 28 | Day 42 |
| Placebo | NC | NC | NC | 194.0 | 182.5 | 131.7 | 155.0 |
| 0.1 | NC | NC | NC | NC | NC | 146.0 | NC |
| 0.3 | NC | NC | NC | 126.0 | 135.0 | 145.0 | 118.0 |
| 1.0 | 130.0 | NC | NC | 113.3 | NC | 140.0 | NC |
| 3.0 | NC | NC | NC | 127.5 | NC | 106.7 | 125.0 |
| 4.5 | NC | NC | 232.5 | 708.0 | 262.5 | 1346.7 | NC |
| 6.0 | NC | 283.3 | 316.7 | 365.0 | 247.5 | NC | 160.0 |

NOTE:
NC = not calculated; insufficient data to calculate mean (n < 3) due to levels being below quantification limit.

TABLE 9

Least Squares Mean Change from Baseline in Fasting GCG
Following Single Dose of GGG Tri-Receptor Agonist.

| | Study Day and HDL-Cholesterol (mmol/L) | | | | | | |
|---|---|---|---|---|---|---|---|
| Dose (mg) | Pre-Dose | Day 2 | Day 3 | Day 7 | Day 14 | Day 28 | Day 42 |
| Placebo | 8.70 | 1.55 | 3.45 | 1.85 | 0.25 | 0.95 | 0.75 |
| 0.1 | 10.50 | 4.34 | 7.34 | 5.17* | 4.50* | 4.67 | 2.67 |
| 0.3 | 6.67 | 1.05 | 1.55 | 1.22 | 0.88 | 0.88 | 1.38 |
| 1.0 | 8.17 | 0.79 | 0.29 | 0.13 | −0.54 | 2.79 | 2.63 |

TABLE 9-continued

Least Squares Mean Change from Baseline in Fasting GCG
Following Single Dose of GGG Tri-Receptor Agonist.

| Dose (mg) | Study Day and HDL-Cholesterol (mmol/L) | | | | | |
|---|---|---|---|---|---|---|
| | Pre-Dose | Day 2 | Day 3 | Day 7 | Day 14 | Day 28 | Day 42 |
| 3.0 | 11.50 | −0.17 | 2.00 | −1.67* | 0.17 | 10.17* | 5.17* |
| 4.5 | 5.83 | −4.34* | −3.25* | −3.84* | −1.92 | 0.58 | 1.41 |
| 6.0 | 7.20 | −3.30* | −3.80* | −3.80* | −3.00* | −0.40 | 1.00 |

TABLE 10

Body Weight Following Single Dose of GGG
Tri-Receptor Agonist.

| Dose (mg) | Study Day and Weight (kg) | | | | |
|---|---|---|---|---|---|
| | Pre-Dose | Day 7 | Day 14 | Day 28 | Day 42 |
| Placebo | 78.69 | 78.59 | 78.67 | 78.11 | 78.2 |
| 0.1 | 79.93 | 80.43 | 80.08 | 80.17 | 80.08 |
| 0.3 | 67.67 | 67.33 | 67.48 | 67.07 | 67.15 |
| 1.0 | 74.08 | 73.53 | 73.12 | 73.58 | 74.07 |
| 3.0 | 86.08 | 85.10 | 85.43 | 85.85 | 85.79 |
| 4.5 | 70.43 | 68.33 | 68.15 | 67.39 | 68.32 |
| 6.0 | 83.44 | 80.03 | 80.06 | 80.47 | 80.51 |

TABLE 11

Least Squares Mean Change from Baseline in VAS Score
Following Single Dose of GGG Tri-Receptor Agonist.

| Dose (mg) | Study Day and VAS Score | | | | | |
|---|---|---|---|---|---|---|
| | Pre-Dose | Day 2 | Day 3 | Day 7 | Day 14 | Day 28 |
| Placebo | 45.52 | 45.04 | 45.73 | 43.08 | 35.95 | 37.45 |
| 0.1 | 42.57 | 41.45 | 42.13 | 35.45 | 45.02 | 42.08 |
| 0.3 | 47.48 | 53.82 | 51.28 | 49.60 | 45.02 | 43.38 |
| 1.0 | 39.55 | 54.52 | 53.35 | 43.73 | 44.77 | 46.82 |
| 3.0 | 35.70 | 50.48 | 56.02 | 38.65 | 34.73 | 40.18 |
| 4.5 | 39.53 | 64.45 | 66.32 | 41.15 | 45.18 | 40.90 |
| 6.0 | 42.02 | 60.02 | 56.90 | 49.40 | 44.24 | 43.72 |

PK results: The SAD study indicates a proportional dose-concentration relationship and indicate one-weekly (QW) dosing is feasible. Following administration of a single dose of the GGG tri-receptor agonist, the maximum observed drug concentration ($C_{max}$) is observed to occur between 1 and 3 days post-dose. The mean terminal $t^{1/2}$ is about 5 to 7 days (i.e., 6 days or about 134-165 hr), thus supporting a QW dosing regimen. The steady state is expected to be reached in about 4 to 5 weeks.

TABLE 12

Summary of PK Parameters of GGG
Tri-Receptor Agonist in Healthy Individuals.

| | PK Parameter | | | | |
|---|---|---|---|---|---|
| Dose (mg) | $AUC_{(0-\infty)}$ (ng.h/mL) | $C_{max}$ (ng/mL) | $t_{max}$ (hr) | $t^{1/2}$ (hr) | CL/F (L/hr) |
| 0.1 | 3750 | 11.0 | 72.0 | 165 | 0.0267 |
| 0.3 | 10300 | 44.8 | 72.2 | 139 | 0.0291 |
| 1.0 | 28300 | 110.0 | 48.0 | 134 | 0.0354 |
| 3.0 | 69100 | 251 | 14.00 | 134 | 0.0434 |
| 4.5 | 130000 | 589 | 12.00 | 163 | 0.0346 |
| 6.0 | 150000 | 635 | 24.00 | 149 | 0.0401 |

Summary: The safety profile of the GGG tri-receptor agonist is similar to that of other GLP-1 and GIP/GLP-1 receptor agonist. PK properties of the GGG tri-receptor agonist enable once weekly dosing. Additionally, weight loss is observed following a single SC injection of the GGG tri-receptor agonist. Mean increases from baseline in insulin and C-peptide are observed following a single SC injection of the GGG tri-receptor agonist, as expected in a healthy population. Significant differences compared with placebo are observed with the higher doses (4.5 mg and 6.0 mg) such as: (1) weight loss is maintained up to Day 43 following a single administration of the two highest doses, and (2) increased overall appetite scores, indicative of a decreased appetite, are observed and significantly differed with 4.5 mg and 6.0 mg compared with placebo.

Example 2: MAD Study

Studies are designed to evaluate the safety, tolerability, PD and PK of the GGG tri-receptor agonist (SEQ ID NO:1) in individuals with diabetes. The MAD study is a randomized, investigator- and participant-blind, placebo-controlled, multiple-ascending dose, single-site study conducted in individuals with diabetes (i.e., females or males aged 20-70 years, inclusive, with T2DM for at least 3 months and HbA1c at lead-in and screening of ≥7.0% and ≤10.5% and treated with diet and exercise alone or a stable dose of metformin for at least 3 months prior to screening, with stable body weight for 3 months prior to randomization and with a BMI of 23-50 kg/m² at screening).

Dose escalation of the GGG tri-receptor agonist is assessed over 12 weeks in cohorts with a starting dose of 0.5 mg. One cohort of 13 individuals is administered 0.5 mg for 12 weeks. A second cohort of 13 individuals is administered 1.5 mg for 12 weeks. A third cohort of 15 individuals is administered 3.0 mg for 12 weeks. A fourth cohort of 15 individuals is administered 3.0 mg for 4 weeks and then administered 6.0 mg for 8 weeks. A fifth cohort of 16 individuals is administered 3.0 mg for 2 weeks, administered 6.0 mg for 2 weeks, administered 9.0 mg for 4 weeks, and then administered 12 mg for 4 weeks. Alternate dose increment steps may be introduced based on emerging safety and tolerability data from the preceding cohorts, and the dose increment steps can be reduced. As a non-limiting example, in Cohort 4, escalation from starting dose of 3 mg may occur via a step-through dose of 4.5 mg before attaining 6 mg, in Cohort 5, escalation from starting dose of 3 to 12 mg may occur via an additional step through dose level of 4.5 mg, prior to the planned doses 6 and 9 mg. In addition to these proposed alternate regimens in Cohort 4 and Cohort 5, planned dose for escalation between cohorts and within cohorts may be further reduced if warranted by safety or tolerability data.

Blood samples are collected on Day 1 at pre-dose and at 12 hr, 24 hr, 48 hr (Day 2) and 72 hr post-dose, as well as at pre-dose on Days 7, 14 and 21, to determine plasma concentration of the GGG tri-receptor agonist. Blood samples also are collected on Day 29 at pre-dose and at 12 hr, 24 hr, 48 hr and 72 hr post-dose, as well as at pre-dose on Days 36, 43 and 50, to determine plasma concentration of the GGG tri-receptor agonist. Blood samples also are collected on Day 57 at pre-dose and at 12 hr, 24 hr, 48 hr and 72 hr post-dose, as well as at pre-dose on Days 64 and 71, to determine plasma concentration of the GGG tri-receptor agonist. Blood samples also are collected on Day 78 at pre-dose and at 12 hr, 24 hr, 48 hr and 72 hr post-dose, as well as at pre-dose on Day 85, to determine plasma concentration of the GGG tri-receptor agonist. Human plasma samples from individuals administered the GGG tri-receptor agonist are analyzed at Q2 Solutions (Ithaca, NY). Concentrations of the GGG tri-receptor agonist are assayed using a validated liquid chromatography high resolution mass spectrometry method, where the lower limits of quantification are 1 ng/ml or 3 ng/ml and the upper limit of quantification is 500 ng/mL.

Blood samples are likewise collected at Weeks 14 and 16 for PK analysis. As above, plasma concentrations are used to compute PK parameters using standard non-compartmental methods in a validated software program (Phoenix WinNonlin Version 8.1).

C-peptide, glucagon, glucose and insulin are measured for an oral glucose tolerance test (OGTT) during the study using methods known in the art for each of the analytes. In addition, HbA1c is measured at Days 1, 29, 57, 78 and 85, as well as at Week 16. The following parameters are derived from the OGTT to assess insulin resistance and β cell function: Homeostatic model assessment (HOMA)-B, HOMA-IR, insulinogenic index, insulin sensitivity (Matsuda Index) and oral glucose insulin sensitivity (OGIS).

Insulin sensitivity is calculated as per the below equation:

$$IGI = \frac{\Delta Insulin_{0-30min}}{\Delta Glucose_{0-30min}},$$

where glucose is in mg/dL and insulin is in µU/mL.

Insulin sensitivity (Matsuda Index) is calculated as per the below equation:

$$ISI = \frac{10000}{\sqrt{G0 * I0 * \frac{Glucose\ AUC(0-2\ h)}{2\ h} * \frac{Insulin\ AUC(0-2\ h)}{2\ h}}},$$

where glucose is in mg/dL and insulin is in µU/mL.

Disposition index is calculated as (IGI*ISI).

OGIS is calculated as per the below equation:

$$OGIS = \frac{1}{2} \times \left(B + sqrt\left(B^2 + 4 \times p5 \times p6 \times (G90 - Gcl) \times Cl_{OGTT}\right)\right),$$

where $B = (p5 \times (G90 - Gcl) + 1) \times Cl_{OGTT}$ $$Cl_{OGTT} = p4 \times \frac{p1 \times D_0 - V \times \frac{G120 - G90}{T} + \frac{p3}{G0}}{190 - I0 + p2}$$

$p1 = 6.50, p2 = 1951, p3 = 4514, p4 = 792, p5 = 11.8 \times 10^{-3}, p6 = 173$.

Satiety VAS is measured after fasting on Days 1, 8, 15, 22, 29, 36, 43, 50, 57, 64, 71, 78 and 80, as well as at Week 16. Appetite sensations are assessed using a VAS for parameters of hunger, fullness, satiety and prospective food intake, and an overall appetite score is calculated as described above in the SAD study.

BW is measured at Days 1, 8, 15, 22, 29, 36, 43, 50, 57, 64, 71, 78 and 85, as well as at Week 16.

In the event of drug hypersensitivity reactions (immediate or nonimmediate), samples are collected for antidrug antibody (ADA) analysis as close to the onset of the event as possible, at the resolution of the event, and 30 days following the onset of the event. Samples are analyzed using a validated electrochemiluminescence immunosorbent assay at BioAgilytix Labs (Durham, NC).

PD results: The MAD study indicates that the GGG tri-receptor agonist is well tolerated. Nausea, diarrhea and vomiting are the most reported GI events, mostly mild in severity and dose related. Dose-dependent increases in heart rate are observed, but partially compensating for a dose-dependent decrease in systolic blood pressure for 6.0 mg and 12.0 mg arms. Percent of individuals who had a heart rate >100 bpm are similar to placebo for 3/6/9/12 mg arm. By the end of the study, C peptide and insulin increase from baseline in all treatment groups. Likewise, GCG, as determined by OGTT, decreases by the end of the study from baseline in all treatment groups other than placebo and 0.5 mg GGG tri-receptor agonist.

TABLE 13

Summary of OGTT Following GGG Tri-Receptor Agonist Administration in Individuals with Diabetes.

| Analyte and Dose | Baseline[a] | Change from Baseline | | |
|---|---|---|---|---|
| | | Day 2 | Day 30 | Day 79 |
| C-peptide AUC (0-2 hr) (pmol.h/L) | | | | |
| Placebo | 2340 | 171 | 346 | 544 |
| 1.5 mg Dula | 2290 | 879 | 1350 | 354 |
| 0.5 mg GGG | 3090 | 169 | 599 | NC |
| 1.5 mg GGG | 2080 | 379 | 1150 | NC |
| 3.0 mg GGG | 2140 | 101 | 886 | 648 |
| 3/6 mg GGG | 2310 | 209 | 1030 | 947 |
| 3/6/9/12 mg GGG | 2380 | 265 | 972 | 940 |
| GCG AUC (0-2 hr) (pmol.h/L) | | | | |
| Placebo | 20.2 | 0.65 | 0.24 | 1.05 |
| 1.5 mg Dula | 25.6 | −1.21 | −4.52 | −1.28 |
| 0.5 mg GGG | 25.2 | 1.61 | 3.56 | NC |
| 1.5 mg GGG | 21.4 | −6.21 | −10.3 | NC |
| 3.0 mg GGG | 28.2 | −10.8 | −20.0 | −20.2 |
| 3/6 mg GGG | 23.7 | −2.70 | −15.0 | −19.3 |
| 3/6/9/12 mg GGG | 27.7 | −5.39 | −20.2 | −25.2 |
| Glucose AUC (0-2 hr) (mmol.h/L) | | | | |
| Placebo | 32.5 | −0.63 | −4.79 | −3.02 |
| 1.5 mg Dula | 34.2 | −9.10 | −10.6 | −8.44 |
| 0.5 mg GGG | 30.3 | −0.69 | −3.38 | NC |
| 1.5 mg GGG | 32.3 | −2.55 | −5.03 | NC |
| 3.0 mg GGG | 37.3 | −8.42 | −14.5 | −12.6 |
| 3/6 mg GGG | 35.2 | −6.66 | −11.0 | −14.0 |
| 3/6/9/12 mg GGG | 32.0 | −7.80 | −10.9 | −9.94 |
| Insulin AUC (0-2 hr) (pmol.h/L) | | | | |
| Placebo | 485 | −42.0 | 73.9 | 127 |
| 1.5 mg Dula | 387 | 322 | 519 | 188 |
| 0.5 mg GGG | 672 | −3.83 | 178 | NC |
| 1.5 mg GGG | 395 | 55.9 | 395 | NC |
| 3.0 mg GGG | 396 | 33.8 | 337 | 301 |
| 3/6 mg GGG | 355 | 80.6 | 538 | 384 |
| 3/6/9/12 mg GGG | 395 | 84.9 | 410 | 413 |

NOTE:
Dula is dulaglutide (Trulicity ®; Eli Lilly and Company; Indianapolis, IN);
GGG is GGG tri-receptor agonist;
NC = not calculated;
[a] = mean absolute value at Day-2.

TABLE 14

Summary of B-Cell Function and Insulin Sensitivity Parameters Derived from OGTT.
Change from Baseline

| Parameter and Dose | Baseline[a] | Day 2 | Day 30 | Day 79 |
|---|---|---|---|---|
| Disposition Index | | | | |
| Placebo | 0.557 | −0.0265 | 0.332 | 0.190 |
| 1.5 mg Dula | 0.456 | 0.0812 | 0.0866 | 0.0481 |
| 0.5 mg GGG | 0.530 | 0.0688 | 0.231 | NC |
| 1.5 mg GGG | 0.289 | −0.0853 | −0.257 | NC |
| 3.0 mg GGG | 0.384 | −0.471 | 1.13 | 0.282 |
| 3/6 mg GGG | 0.372 | 0.00809 | 0.468 | 0.0330 |
| 3/6/9/12 mg GGG | 0.551 | −0.0142 | 0.556 | 0.319 |
| HOMA2-B | | | | |
| Placebo | 44.6 | −4.97 | 0.892 | 0.629 |
| 1.5 mg Dula | 29.1 | 31.2 | 42.2 | 25.9 |
| 0.5 mg GGG | 55.5 | 1.22 | 8.07 | NC |
| 1.5 mg GGG | 36.7 | 2.73 | 14.6 | NC |
| 3.0 mg GGG | 29.2 | 10.5 | 48.1 | 34.3 |
| 3/6 mg GGG | 34.9 | 5.74 | 30.3 | 42.4 |
| 3/6/9/12 mg GGG | 32.3 | 17.3 | 61.3 | 40.3 |
| HOMA2-IR | | | | |
| Placebo | 1.78 | −0.100 | −0.0846 | 0.314 |
| 1.5 mg Dula | 1.26 | 0.360 | 0.480 | 0.600 |
| 0.5 mg GGG | 2.25 | 0.0667 | 0.389 | NC |
| 1.5 mg GGG | 1.88 | 0.556 | 0.443 | NC |
| 3.0 mg GGG | 2.06 | 0.536 | 0.670 | 0.0545 |
| 3/6 mg GGG | 1.85 | 0 | −0.0111 | 0.2000 |
| 3/6/9/12 mg GGG | 1.23 | 0.600 | 0.770 | 0.390 |
| Insulin Sensitivity Matsuda Index | | | | |
| Placebo | 3.49 | −0.290 | −0.196 | −1.60 |
| 1.5 mg Dula | 3.70 | −0.0208 | −0.476 | −1.14 |
| 0.5 mg GGG | 2.42 | −0.113 | −0.425 | NC |
| 1.5 mg GGG | 3.24 | −0.466 | −1.04 | NC |
| 3.0 mg GGG | 2.72 | −0.179 | 0.0214 | 0.708 |
| 3/6 mg GGG | 3.15 | 0.0844 | −0.361 | 0.928 |
| 3/6/9/12 mg GGG | 3.92 | −0.115 | −0.682 | −0.500 |
| Insulinogenic Index | | | | |
| Placebo | 0.194 | 0.0139 | 0.108 | 0.159 |
| 1.5 mg Dula | 0.173 | 0.119 | 0.130 | 0.105 |
| 0.5 mg GGG | 0.277 | 0.0721 | 0.298 | NC |
| 1.5 mg GGG | 0.137 | −0.0334 | −0.0240 | NC |
| 3.0 mg GGG | 0.225 | −0.334 | 0.344 | 0.0112 |
| 3/6 mg GGG | 0.172 | −0.0389 | 0.244 | 0.117 |
| 3/6/9/12 mg GGG | 0.180 | −0.0280 | 0.233 | 0.238 |
| OGIS Index | | | | |
| Placebo | 276 | −15.1 | 1.52 | −24.7 |
| 1.5 mg Dula | 256 | 23.5 | 19.4 | 38.1 |
| 0.5 mg GGG | 269 | −4.72 | −19.1 | NC |
| 1.5 mg GGG | 248 | −3.25 | 13.3 | NC |
| 3.0 mg GGG | 226 | 14.4 | 70.7 | 71.6 |
| 3/6 mg GGG | 251 | 5.39 | 12.8 | 54.8 |
| 3/6/9/12 mg GGG | 263 | 5.92 | 51.7 | 35.3 |

PK results: The results of the MAD study indicate that PK is similar between healthy and individuals with diabetes and indicate QW dosing is feasible given the mean half-life is about 6 days (134-165 hr).

$T_{max}$ is within 12-72 hr after dosing.

TABLE 15

Summary of PK Parameters of GGG Tri-Receptor Agonist in Individuals with Diabetes at Day 1.

| Dose (mg) | $AUC_{(0-\infty)}$ (ng·h/mL) | $C_{max}$ (ng/mL) | $t_{max}$ (hr) | $t^{1/2}$ (hr) | CL/F (L/hr) |
|---|---|---|---|---|---|
| 0.5 QW | 7180 | 54.1 | 48.00 | ND | ND |
| 1.5 QW | 22600 | 228 | 24.00 | ND | ND |
| 3.0 QW | 33800 | 290 | 23.83 | ND | ND |
| 3.0, 6.0 QW | 34500 | 292 | 24.00 | ND | ND |
| 3.0, 6.0, 9.0, 12.0 QW | 31800 | 265 | 23.95 | ND | ND |

NOTE:
ND = not done

TABLE 16

Summary of PK Parameters of GGG Tri-Receptor Agonist in Individuals with Diabetes at Day 29.

| Dose (mg) | $AUC_{(0-\infty)}$ (ng·h/mL) | $C_{max}$ (ng/mL) | $t_{max}$ (hr) | $t^{1/2}$ (hr) | CL/F (L/hr) |
|---|---|---|---|---|---|
| 0.5 QW | 14400 | 118 | 23.83 | ND | ND |
| 1.5 QW | 35900 | 252 | 24.02 | ND | ND |
| 3.0 QW | 68100 | 531 | 12.17 | ND | ND |
| 3.0, 6.0 QW | 86400 | 711 | 12.13 | ND | ND |
| 3.0, 6.0, 9.0, 12.0 QW | 150000 | 1320 | 23.83 | ND | ND |

NOTE: ND = not done

TABLE 17

Summary of PK Parameters of GGG Tri-Receptor Agonist in Individuals with Diabetes at Day 57.

| Dose (mg) | $AUC_{(0-\infty)}$ (ng·h/mL) | $C_{max}$ (ng/mL) | $t_{max}$ (hr) | $t^{1/2}$ (hr) | CL/F (L/hr) |
|---|---|---|---|---|---|
| 0.5 QW | 11800 | 86.8 | 35.99 | ND | ND |
| 1.5 QW | NC | NC | NC | ND | ND |
| 3.0 QW | 66300 | 562 | 24.00 | ND | ND |
| 3.0, 6.0 QW | 136000 | 1170 | 24.00 | ND | ND |
| 3.0, 6.0, 9.0, 12.0 QW | 262000 | 2070 | 24.02 | ND | ND |

NOTE:
ND = not done;
NC = not calculated

TABLE 18

Summary of PK Parameters of GGG Tri-Receptor Agonist in Individuals with Diabetes at Day 78.

| Dose (mg) | $AUC_{(0-\infty)}$ (ng·h/mL) | $C_{max}$ (ng/ml) | $t_{max}$ (hr) | $t^{1/2}$ (hr) | CL/F (L/hr) |
|---|---|---|---|---|---|
| 0.5 QW | NC | NC | NC | NC | NC |
| 1.5 QW | NC | NC | NC | NC | NC |
| 3.0 QW | 70100 | 571 | 12.17 | 137 | 0.0428 |
| 3.0, 6.0 QW | 137000 | 1060 | 24.00 | 135 | 0.0437 |
| 3.0, 6.0, 9.0, 12.0 QW | 293000 | 2410 | 23.92 | 143 | 0.0410 |

NOTE:
ND = not done;
NC = not calculated

TABLE 19

Change in Daily Mean Plasma Glucose Following GGG Tri-Receptor Agonist Administration in Individuals with Diabetes.

| Dose (mg) | Study Day and Daily Mean Plasma Glucose (% Change from Baseline; mmol/L) | | | | |
|---|---|---|---|---|---|
| | Baseline[a] | Day 3 | Day 31 | Day 59 | Day 80 |
| Placebo | 10.73 | −0.31 | −1.57 | −1.31 | −1.28 |
| 1.5 Dula | 11.83 | −2.60* | −3.89* | −3.21* | −3.73* |
| 0.5 GGG | 9.99 | −0.07 | −1.93 | −0.81 | ND |
| 1.5 GGG | 12.45 | −1.53* | −1.85 | −3.39 | −3.15 |
| 3 GGG | 12.53 | −2.17* | −4.21* | −4.49* | −4.07* |
| 3/6 GGG | 12.47 | −1.60* | −3.81* | −4.54* | −4.35* |
| 3/6/9/12 GGG | 11.48 | −2.36* | −3.88* | −4.23* | −4.13* |

NOTE:
Dula is dulaglutide (Trulicity ®; Eli Lilly and Company; Indianapolis, IN);
GGG is GGG tri-receptor agonist;
ND = not done.
[a] = baseline values are the daily means on Day-1;
*= indicates the difference in least squares means change from baseline for LY3437943 compared to placebo is statistically significant (90% CI does not span 0).

TABLE 20

Change in HbA1c Following GGG Tri-Receptor Agonist Administration in Individuals with Diabetes.

| Dose (mg) | Study Day and HbA1c (% Change from Baseline; %) | | | | |
|---|---|---|---|---|---|
| | Pre-Dose | Day 29 | Day 57 | Day 78 | Day 85 | Day 106 |
| Placebo | 8.82 | −0.375 | −0.606 | −0.485 | −0.337 | −0.435 |
| 1.5 Dula | 8.42 | −0.646 | −0.997 | −1.07 | −0.960 | −0.538 |
| 0.5 GGG | 8.10 | −0.483 | −0.715 | ND | ND | ND |
| 1.5 GGG | 8.71 | −0.271 | −1.12 | −1.19 | −1.18 | −0.955 |
| 3 GGG | 8.63 | −0.827* | −1.34* | −1.64* | −1.70* | −1.37* |
| 3/6 GGG | 8.96 | −0.953* | −1.67* | −2.04* | −1.90* | −1.87* |
| 3/6/9/12 GGG | 8.45 | −0.853* | −1.23* | −1.46* | −1.59* | −1.58* |

NOTE:
Dula is Dulaglutide; GGG is GGG tri-receptor agonist; ND = not done.
[a]baseline values are the daily means on Day −1;
*indicates the difference in least squares means change from baseline for LY3437943 compared to placebo is statistically significant (90% CI does not span 0).

During the MAD study, decreases in mean body weight are observed in all GGG tri-receptor agonist dose groups, except 0.5 mg, at each time point assessed. The trend for decreased body weight appears dose-dependent, where the mean changes from baseline in body weight at the end of the 12-week treatment period are as follows: placebo is 0.6 kg at Day 85; 0.5 mg GGG tri-receptor agonist is 0.6 kg at Day 43 (last mean value calculated); 1.5 mg GGG tri-receptor agonist is −1.1 kg at Day 43 (last mean value calculated); 3.0 mg GGG tri-receptor agonist is −4.4 kg at Day 85; 3/6 mg GGG tri-receptor agonist is −7.5 kg at Day 85; 3/6/9/12 mg GGG tri-receptor agonist is −8.4 kg at Day 85. Decreases from baseline in mean body weight also are observed following 12-weeks treatment period with 1.5 mg dulaglutide, with a maximum decrease of 1.3 kg. Over the 12-week dosing period in the placebo group, mean body weight remains stable near baseline values.

Moreover, during the MAD study, decreases in mean waist circumference are observed in all GGG tri-receptor agonist dose groups; a trend this is not observed in the placebo group. The mean decrease from baseline in waist circumference at the end of the 12-week treatment period are as follows: 0.5 mg GGG tri-receptor agonist is −2.9 cm at Day 71 (last mean value calculated); 1.5 mg GGG tri-receptor agonist is −4.6 cm at Day 43 (last mean value calculated); 3.0 mg GGG tri-receptor agonist is −5.9 cm at Day 85; 3/6 mg GGG tri-receptor agonist is −2.1 cm at Day 85; and 3/6/9/12 mg GGG tri-receptor agonist is −7.0 cm at Day 85. Decreases in mean waist circumference also are observed over the 12-week dosing period with 1.5 mg dulaglutide, with a decrease from baseline of 4.9 cm on Day 85.

Furthermore, during the MAD study, overall appetite scores generally increase from baseline in all treatment groups, except for 0.5 mg GGG tri-receptor agonist and placebo, across the 12-week treatment period. The increases from baseline in overall appetite score are comparable for the 1.5, 3.0, 3/6 and 3/6/9/12 mg GGG tri-receptor agonist treatment groups. By the end of the 12-week treatment period (Day 78), mean overall appetite score remains increased from baseline in all treatment groups, other than placebo, and by Day 106, 28 days after the last dose, the overall appetite scores in all treatment groups had returned to at or near baseline.

Over the 12-week treatment period, hunger scores decrease from baseline at the majority of timepoints assessed in all treatment groups, except for 0.5 mg GGG tri-receptor agonist. The placebo group hunger scores and 0.5 mg GGG tri-receptor agonist remain stable and near baseline throughout the 12-week treatment period. The decreases from baseline in hunger score are comparable between the ≥1.5 mg GGG tri-receptor agonist and dulaglutide treatment groups.

Over the 12-week treatment period, satiety scores increase from baseline at all timepoints assessed in the 1.5 mg dulaglutide and 3/6 mg GGG tri-receptor agonist treatment groups. The satiety scores of all other GGG tri-receptor agonist treatment groups and placebo remained generally stable and near baseline throughout.

Over the 12-week treatment period, prospective food consumption scores generally decrease from baseline at the majority of time points in all treatment groups, including placebo. The greatest decreases from baseline in food consumption scores are observed in the 1.5 mg dulaglutide group. Apart from the 0.5 mg GGG tri-receptor agonist treatment group, where decreases from baseline where minimal, the decreases from baseline in food consumption scores are generally comparable between the ≥1.5 mg GGG tri-receptor agonist treatment groups.

Over the 12-week treatment period, fullness scores increase from baseline at all timepoints assessed in the ≥3.0 mg GGG tri-receptor agonist and 1.5 mg dulaglutide treatment groups. The fullness scores in the placebo and 1.5 and 0.5 mg GGG tri-receptor agonist treatment groups remain stable and near baseline throughout. The increases from baseline in fullness scores are generally comparable between the ≥3.0 mg GGG tri-receptor agonist and dulaglutide treatment groups.

Summary: Once-weekly doses of 0.5, 1.5 and 3.0 mg of the GGG tri-receptor agonist for 12-weeks are considered well tolerated. Higher doses of ≥6.0 mg of the GGG tri-receptor agonist are associated with increased incidences of AEs. The most commonly reported TEAEs are GI events, which include diarrhea, nausea, abdominal distension, eructation, dyspepsia, vomiting and constipation. There are no unexpected safety concerns following multiple SC does of 0.5 to 12.0 mg of the GGG tri-receptor agonist.

During QW dosing of the GGG tri-receptor agonist for 12 weeks, statistically significant decreases from baseline in mean daily plasma glucose and HbA1c are observed at doses ≥3.0 mg as compared to placebo. In addition, decreases from baseline in body weight are observed during QW dosing of the GGG tri-receptor agonist at doses from 1.5 to 12.0 mg for 12 weeks, where the greatest decreases are observed following doses of ≥3.0 mg.

Values of geometric mean t½ for the GGG tri-receptor agonist are similar across all dose levels ranging from about 135 to 143 hr (i.e., about 6 days). Dose proportionality analysis at the 3.0, 6.0 and 12.0 mg dose levels of the GGG tri-receptor agonist at Week 12 show that AUC (0-τ) and $C_{max}$ increase in a dose-proportional manner, while the increases in exposures show some sub-proportionality at the lowest 3 dose levels of 0.5 to 3.0 mg.

Example 3: Phase 2 Studies for T2DM

Studies are designed to further evaluate the effectiveness and safety of the GGG tri-receptor agonist (SEQ ID NO: 1) in a larger population of individuals with diabetes. The study is a randomized, investigator- and participant-blind, placebo-controlled study conducted in individuals with diabetes (i.e., females or males aged 18-75 years, inclusive, with T2DM for at least 3 months and HbA1c at lead-in and screening of ≥7.0% and ≤10.5% and treated with diet and exercise alone or a stable dose of metformin for at least 3 months prior to screening, with stable body weight for 3 months prior to randomization and with a BMI of 25-50 kg/m² at screening).

Dose escalation of the GGG tri-receptor agonist is assessed over 36 weeks in cohorts administered the GGG tri-receptor agonist, dulaglutide or placebo. A first cohort of 50 individuals is administered 2.0 mg of the GGG tri-receptor agonist for Weeks 1-4, 4.0 mg for the Weeks 5-8, 8.0 mg for Weeks 9-12, and then 12.0 mg for Weeks 13-36. A second cohort of 20 individuals is administered 4.0 mg of the GGG tri-receptor agonist for Weeks 1-4, and then 8.0 mg for Weeks 5-36. A third cohort of 20 individuals is administered 2.0 mg of the GGG tri-receptor agonist for Weeks 1-4, 4.0 mg for Weeks 5-8, and then 8.0 mg for Weeks 9-36. A fourth cohort of 30 individuals is administered 4.0 mg of the GGG tri-receptor agonist for Weeks 1-36. A fifth cohort of 30 individuals is administered 2.0 mg of the GGG tri-receptor agonist for Weeks 1-4, and then 4.0 mg for Weeks 5-36. A sixth cohort of 50 individuals is administered 0.5 mg of the GGG tri-receptor agonist for Weeks 1-36. A seventh cohort of 50 individuals is administered 1.5 mg of dulaglutide for Weeks 1-36. An eight cohort of 50 individuals is administer a placebo for Weeks 1-36.

Blood samples are collected pre-dose and at Week 24 for HbA1c. Samples also are collected to measure change in HbA1c and FBG from baseline to Week 24 and to Week 36.

In addition, change in body weight (kg) is assessed from baseline to Week 24 and to Week 36.

A safety follow-up is conducted on the individuals from Weeks 37-40.

The 16 week data support the efficacy, safety and tolerability of the GGG tri-receptor agonist over the evaluated dose range. The benefit/risk profile of the GGG triagonist doses and dosing regimens that initiate dose titration at 1 and 2 mg dose, and escalation to the maximum dose of 12 mg, with once weekly subcutaneous administration, using dose steps of 1, 2, 3 or 4 mg have acceptable tolerability profiles while maximizing the efficacy benefits with minimal risk of adverse events.

Example 4: Phase 2 Studies for Obesity and NAFLD

Studies are designed to further evaluate the effectiveness and safety of the GGG tri-receptor agonist (SEQ ID NO:1) in a larger population of obese individuals or overweight individuals. The study is a randomized, investigator- and participant-blind, placebo-controlled study conducted in obese individuals or overweight individuals without diabetes (i.e., females or males aged 18-75 years, inclusive, with obesity prior to randomization and with a BMI of ≥30 kg/m² at screening or overweight prior to randomization and with a BMI of ≥27 kg/m² or <30 kg/m² at screening with weight-related comorbidities but without T2DM).

Dose escalation of the GGG tri-receptor agonist is assessed over 36 weeks in cohorts administered the GGG tri-receptor agonist, dulaglutide or placebo. A first cohort of 60 individuals is administered 2.0 mg of the GGG tri-receptor agonist for Weeks 1-4, 4.0 mg for the Weeks 5-8, 8.0 mg for Weeks 9-12, and then 12.0 mg for Weeks 13-48. A second cohort of 30 individuals is administered 4.0 mg of the GGG tri-receptor agonist for Weeks 1-4, and then 8.0 mg for Weeks 5-48. A third cohort of 30 individuals is administered 2.0 mg of the GGG tri-receptor agonist for Weeks 1-4, 4.0 mg for Weeks 5-8, and then 8.0 mg for Weeks 9-48. A fourth cohort of 30 individuals is administered 4.0 mg of the GGG tri-receptor agonist for Weeks 1-48. A fifth cohort of 30 individuals is administered 2.0 mg of the GGG tri-receptor agonist for Weeks 1-4, and then 4.0 mg for Weeks 5-48. A sixth cohort of 60 individuals is administered 1.0 mg of the GGG tri-receptor agonist for Weeks 1-48. A seventh cohort of 50 individuals is administered placebo for Weeks 1-48. An additional 125 individuals are assessed for NAFLD, which is characterized by ≥10% liver fat by magnetic resonance imaging proton density fat fraction (MRI-PDFF).

Body weight is assessed at pre-dose and at Week 24 and at Week 48 for % change in body weight. Mean change in waist circumference (cm) is measured at Week 24 or Week 48.

A safety follow-up is conducted on the individuals from Weeks 49-52.

The 16 week data support the efficacy, safety and tolerability of the GGG tri-receptor agonist over the evaluated dose range of 2-12 mg. The benefit/risk profile of the GGG triagonist doses and dosing regimens that initiate dose titration at 1 and 2 mg dose, and escalation to the maximum dose of 12 mg, with once weekly subcutaneous administration, using dose steps of 1, 2, 3 or 4 mg have acceptable tolerability profiles while maximizing the efficacy benefits with minimal risk of adverse events.

SEQUENCES

The following nucleic and/or amino acid sequences are referred to in the disclosure and are provided below for reference.

-Incretin Analog/GGG Tri-Receptor Agonist

SEQ ID NO: 1

Y-Aib-QGTFTSDYSI-αMeL-LDKK((2-[2-(2-amino-ethoxy)-ethoxy]-acetyl)-(γGlu)-CO-(CH$_2$)$_{18}$-CO$_2$H)AQ-Aib-AFIEYLLEGGPSSGAPPPS-NH$_2$

The invention claimed is:

1. A method of providing chronic weight management in an individual having a body mass index (BMI) of ≥27 kg/m2, the method comprising:
 administering to the individual a first once weekly dose of a glucose-dependent insulinotropic polypeptide (GIP), glucagon-like peptide-1 (GLP-1) and glucagon (GCG) (GGG) tri-receptor agonist comprising SEQ ID NO:1, wherein the first once weekly dose is about 2.0 mg and is administered for at least 1 week,
 increasing the first once weekly dose by increments of about 1.0 mg to about 4.0 mg to a once weekly dose of ≤12.0 mg, wherein each increased once weekly dose is administered for at least 1 week.

2. The method of claim 1, wherein the individual initially has a body mass index (BMI) ≥30 kg/m2.

3. A method of providing chronic weight management in an individual having a body mass index (BMI) of ≥27 kg/m2, the method comprising the steps of:
 (a) administering to the individual about 2.0 mg of a glucose-dependent insulinotropic polypeptide (GIP), glucagon-like peptide-1 (GLP-1) and glucagon (GCG) (GGG) tri-receptor agonist comprising a structure of SEQ ID NO:1 for at least 1 week;
 (b) administering to the individual about 4.0 mg of the GGG tri-receptor agonist for at least 1 week; and
 (c) administering to the individual about 6.0 mg of the GGG tri-receptor agonist weekly for at least 1 week.

4. The method of claim 3, further comprising the step of:
 (d) administering to the individual about 9.0 mg of the GGG tri-receptor agonist weekly for at least 1 week.

5. The method of claim 4, further comprising the step of:
 (e) administering to the individual about 12.0 mg of the GGG tri-receptor agonist weekly for at least 1 week.

6. The method of claim 5, wherein each of steps (a)-(e) comprises administering the GGG tri-receptor agonist for at least 4 weeks.

7. The method of claim 6, wherein the individual initially has a body mass index (BMI) ≥30 kg/m2.

8. The method of claim 3, wherein the method results in a decrease in body weight of at least about 7.5 kg.

* * * * *